(12) United States Patent
Tashkandi

(10) Patent No.: US 12,373,422 B2
(45) Date of Patent: Jul. 29, 2025

(54) SYSTEM AND METHOD FOR PATCHING DATABASE AS A SERVICE WITH MINIMAL DOWNTIME

(71) Applicant: SAUDI ARABIAN OIL COMPANY, Dhahran (SA)

(72) Inventor: Alalaa N. Tashkandi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/409,351

(22) Filed: Jan. 10, 2024

(65) Prior Publication Data

US 2025/0225120 A1 Jul. 10, 2025

(51) Int. Cl.
*G06F 16/23* (2019.01)
*G06F 11/14* (2006.01)

(52) U.S. Cl.
CPC ...... *G06F 16/2365* (2019.01); *G06F 11/1448* (2013.01); *G06F 2201/80* (2013.01)

(58) Field of Classification Search
CPC ............ G06F 16/2365; G06F 11/1448; G06F 2201/80
See application file for complete search history.

(56) References Cited

U.S. PATENT DOCUMENTS

| | | | |
|---|---|---|---|
| 8,407,687 B2 | 3/2013 | Moshir et al. | |
| 9,720,951 B2 | 8/2017 | Yancey et al. | |
| 9,886,263 B2 | 2/2018 | Banford et al. | |
| 10,521,312 B1 * | 12/2019 | Nikhil | G06F 11/1469 |
| 10,620,933 B2 | 4/2020 | Banford et al. | |
| 10,803,078 B2 | 10/2020 | Jain et al. | |
| 10,860,306 B2 * | 12/2020 | Velusamy | G06F 8/71 |
| 10,938,849 B2 | 3/2021 | Blasak da Fonseca et al. | |
| 11,379,434 B2 * | 7/2022 | Sherazi | G06F 11/0793 |
| 11,892,918 B2 * | 2/2024 | Rayaraddi | G06F 9/5038 |

FOREIGN PATENT DOCUMENTS

EP 3273363 B1 5/2019

* cited by examiner

*Primary Examiner* — Cheyne D Ly
(74) *Attorney, Agent, or Firm* — Leason Ellis LLP

(57) ABSTRACT

A method and system are disclosed for preparing and providing database patching as a service. At least one computing device generates a model for implementing steps for database patching. The model includes steps for uptime processes and downtime processes. The computing device(s) determine a new patch to be applied to a respective database and clones the model. Further, the computing device(s) customize the cloned model as a function of parameters associated with the respective database and generates a clone of the respective database. Additionally, the computing device(s) execute, via the model, pre-patching steps on the clone of the respective database, patching steps on the clone of the respective database, and post-patching steps on the clone of the respective database. The computing device(s) determine whether a rollback is indicated, and implements a rollback process where the rollback is indicated or does not implement a rollback process if not indicated.

20 Claims, 18 Drawing Sheets

SYSTEM AND METHOD FOR PATCHING DATABASE AS A SERVICE WITH MINIMAL DOWNTIME

FIELD OF THE DISCLOSURE

This patent application relates, generally, to database patching and, more particularly, to applying database patches as a service in standalone and highly available environments.

BACKGROUND OF THE DISCLOSURE

Companies utilize database management systems to store business transactions and data. Patching is a critical aspect of database lifecycle management. Patches are applied to secure systems, resolve bugs, or add new features to database systems. Cloud Service Provider currently offer Database as a Service ("DBaaS") and DBaaS providers strive to provide efficient and automated lifecycle management operations, including patching operations, for their customers.

Users interface with database systems, such as by using web-based solutions or client tools to query and access a database. Stateful enterprise applications require secure and efficient ways to store, update, and retrieve data. Moreover, enterprise resource planning (ERP) systems, supply chain management systems, financial & accounting systems, and customer relationship management (CRM) systems generally utilize database systems such as HANA, ORACLE or POSTGRESQL to ensure a persistent layer of data. With the development of network infrastructure and speed of the Internet, database systems are offered as a service to enterprises and other organizations requiring the use of technology to process data. Still further, confidentiality, integrity and availability of data needs to be maintained while being processed, in transit, in memory or at rest.

Accordingly, database systems vendors or suppliers often release security patches regularly to address newly discovered security vulnerabilities. Patches are also released to fix bugs in the software, to address compatibility issues or to comply with new regulatory requirements. Patches are used to harden systems that are provided in different configurations and environments, and used by organizations around the world.

Given the need to release patches to address vulnerabilities, fix bugs or introduce new required features, patches may introduce unintended negative side effects. As a result, quality assurance processes may be introduced by database service providers in order to minimize business interruptions. In cases where side effects are discovered following database patching, efficient rollback processes may be needed to maintain database operations while investigating the root cause and conducting repairs. In an environment with critical business operations, a standby system can be maintained to take over primary operations, in case of failure of a production database system. In such instances, standby systems also need to be secure and patched at the same level as the production system.

Accordingly, patching implementations may fail or otherwise cause side effects that impact the usability of a database system. For example, if a new feature or capability added to a database system through a patch is not well tested or coded, existing features of the database system can be negatively impacted or new security vulnerabilities introduced. Such unintended consequences may not be apparent due to insufficient quality assurance and testing. Quality assurance can fail when testing occurs in a computing environment that does not factor aspects of the target database environment, such as one or more operating systems, disks, hardware components, networks, and memory settings. Given the possible combinations of factors in various database environments, accurate testing may not be feasible and, unfortunately, faulty patches can disable system features and lead to extended downtime.

It is with respect to these and other concerns that the present disclosure is provided.

SUMMARY OF THE DISCLOSURE

In one or more implementations, a method and system are disclosed for preparing and providing database patching as a service. At least one computing device configured by executing instructions stored on non-transitory processor readable media generates a model for implementing steps for database patching. The model includes steps for uptime processes and downtime processes. The at least one computing device determines a new patch to be applied to a respective database and clones the model. Further, the at least one computing device customizes the cloned model as a function of parameters associated with the respective database and generates a clone of the respective database. Additionally, the at least one computing device executes, via the model, pre-patching steps on the clone of the respective database, patching steps on the clone of the respective database, and post-patching steps on the clone of the respective database. The at least one computing device determines whether a rollback is indicated, and implements a rollback process where the rollback is indicated or does not implement a rollback process where the rollback is not indicated.

In one or more implementations, the at least one computing device uses the model to patch the respective database.

In one or more implementations, the rollback process includes destroying, by the at least one computing device, the clone of the respective database.

In one or more implementations, the at least one computing device determines a failed process and generates and transmits a notification associated with the failed process.

In one or more implementations, the failed process includes at least one of an invalid database object, a failed patching process, and a failed rollback.

In one or more implementations, the parameters include network configuration information, database configuration information, and standby database configuration information.

In one or more implementations, the database configuration includes a specific database release and the model includes a plurality of submodels.

In one or more implementations, the plurality of submodels include operations for pre-patch logical fixes, patching database objects, post-patch logical fixes, recompiling patched database objects, and hardening database security.

In one or more implementations, the at least one computing device creates a database restore point prior to executing the pre-patching steps and the post-patching steps and removes the restore point after patching the respective database.

Additional features, advantages, and embodiments of the disclosure may be set forth or apparent from consideration of the detailed description and drawings. It is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF CERTAIN EMBODIMENTS ACCORDING TO THE DISCLOSURE

Figure 1:
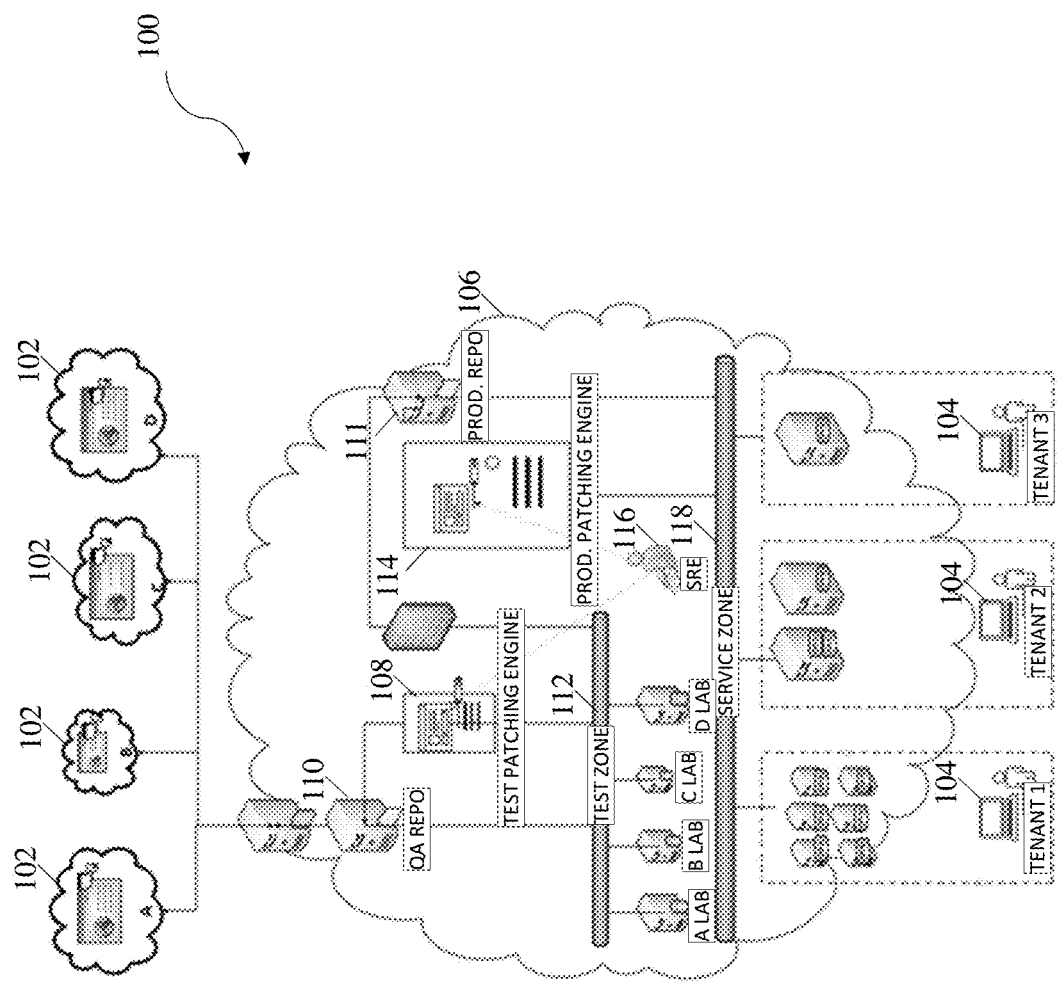
FIG. 1 illustrates a high-level view of system, in accordance with an example implementation of the present disclosure.

By way of overview and introduction, the present disclosure presents method(s) and system(s) for preparing and applying database patching, including by applying database patching as a service for both standalone and distributed computing environments. Implementations of the present disclosure are usable to enhance patching of database systems by organizations utilizing one or more database systems, as well as by cloud service providers offering database as a service ("DBaaS") technology.

In one or more implementations, a database patching model is generated and used in connection with specific database types, releases, and environments. The model can include multiple sub-models, each performing one or more database patching steps. A patching model and patch can be cloned from an abstract patching model and, thereafter, parameterized to reflect and apply unique requirements applicable for a given patch. Patching processes can be sub-divided into uptime and downtime processes, which can be stitched together in cases requiring patching to execute as a single process, such as test environments or non-critical production systems. Further, a patching system including a patching model and processes in accordance with the present disclosure can be suitably orchestrated between a database system and a corresponding standby database system.

In one or more implementations, one or more computing device configured by executing instructions can detect a new database patch and, in response, provide one or more prompts to download one or more packages comprising the new patch. The packages with instructions (e.g., steps) for implementing the new patch can be downloaded, for example, to a local QA repository at a given destination associated with a database system type and release. Moreover, a patching process model for a database system of specific release can be available in as an abstract process. In an example operation, a patching process model is cloned and updated automatically based on one or more implementation steps, including scanning to generate a parametrized patching process model targeting a specific database type and release. Further, one or more computing devices can be configured to trigger testing activity in a test lab, for example, based on the generation event of the parameterized patching process model. Following a successful test event, one or more computing devices can automatically release and publish the parameterized patching process model for production use.

An advantage of the computing architecture shown and described herein is an efficient targeting and management of different types of database systems efficiently and with minimal downtime. A wide variety of proprietary and open source database systems are supported by the teachings herein, notwithstanding capital and operational cost, security, performance, availability, expertise, features, reliability, reputation, regulatory compliance or compatibility with other computer systems. Moreover, the present disclosure reduces or eliminates negative side effects typically associated with patching processes, which impact usability of a given database system. For example, and without limitation, one or more computing devices can automatically rollback database system(s) with zero data loss and minimal downtime, for example, based on a patching application failure. These and other benefits can be extended to database systems with standby database systems.

Referring now to the drawings, FIG. 1 illustrates a high-level view of system 100, in accordance with an example implementation of the present disclosure. System 100 includes an architecture of computing devices that are configured to provide DBaaS and database patching as a service technologies for a plurality of customers/tenants, each having one or a plurality of database systems 104. System 100 is configured to flexibly support various database system types and releases, and patches for each type and release, including as provided by respective database systems vendors.

Continuing with reference to FIG. 1, a plurality of database suppliers 102, including suppliers of database packages and of patches, are illustrated at the top of the figure. Shown in the middle of the figure is Database as a Service provider 106 includes a computing technology architecture that is configured to monitor suppliers for new versions and patches, for example, using a test patching engine 108. Test patching engine 108 includes one or more computing devices configured to access, for example, a supplier software repository for new releases of packages. Once discovered, a download prompt can be provided and/or initiated to download the packages and implementation steps to a respective local QA database repository 110 in a specific destination associated with a respective database system type and release.

Continuing with reference to FIG. 1, a patching process model for a database system of specific release is available in test patching engine 108 as an abstract process. The model can be cloned by test patching engine 108 and assigned a tag associated with the patch version/number. In operation, test patching engine 108 can scan and analyze implementation steps, including pre-patching steps, parameters requirements, patching steps, post patching steps, and rollback steps. A cloned patching process model can be updated automatically, for example, based on determining, e.g., by scanning, implementation steps. In one or more implementations, pre-patching steps, parameters, patching steps, post patching steps and rollback steps are embedded in the relevant patching process model in test patching engine 108. The model can be released in test zone 112.

A patching process model can include multiple automation templates or sub-models in one or more implementations of the present disclosure. Templates or sub-models can include, for example, uptime, downtime and rollback templates. The standard templates can be cloned to generate a patching process model for specific database type and release.

In one or more implementations of the present disclosure, a new patching model event for a specific database type and release triggers a test in a test lab via test zone 112. For example, one or more computing devices automatically generate a copy of a relevant lab and a patching process model is executed against the cloned lab. As used herein, a "lab" refers, generally to a database test environment, which can include computing resources, such as virtual machines, containers, or physical devices, an operating system, and a database system connected to a network. In operation, a lab database system can be fenced to isolate it from the rest of a data center, such as by using virtual or physical network firewall.

In one or more implementations, a lab represents a specific database type and release. For instance, one lab that supports HANA database release 2 support package 6 built using virtual machine with REDHAT 8 Operating system with 100 GB of RAM, 400 GB of Disk storage and 8 virtual CPUs. In such instances, required OS packages can be installed in this server. The lab hosts a test database with the base patch of HANA that is supported by the Database as a Service Provider.

Further, a patch level of the database in the lab can be rolled forward by applying patches that have been recently released. The database can be rolled backward to restore to the original state and simulate additional patches from the base level. To minimize the cost and waste of computing resources in the lab, once the simulating and testing is achieved, the server can be shutdown and an image of it is stored in disk. This is to use the lab for other purposes and using the computing resource to test patching of other database types such as an ORACLE 19C database. Since an ORACLE database can demand fewer resources of memory and CPU in specific scenarios, the present disclosure enables distributing the same resources that were allocated to one test database system to, for example, three test database systems, in cases where the servers are virtual machines or the lab is container based.

The significance of rolling patches forward and backward is recognized herein, on grounds that maintaining a lab image of each patch is not practical. However, it is practical to have a base level of each database type and release. Accordingly, to mimic a production environment in a datacenter, the base level in the lab is rolled forward to the current patch level in the production environment. Thereafter, a newly released patch level can be applied over the current patch level. By automating this process, modeling of patches implementations, cloning of labs and reusability of computing resources, simulation of all possible scenarios can be enabled and practically implemented.

Given that a cloud service provider may have different customers, each having different database patch levels and OS environments, multiple clones of the database systems that have the base image can be generated. Each clone can be adapted to mimic a tenant environment, for example, by reflecting the current database patch level. This is possible because models of the old patches are available in the test patching engine. Once prepared, the lab is ready for simulating the implementation of the latest patch.

Moreover, a lab can be provided in a physical server or virtual machine co-hosting multiple database systems with different types, releases, names and installation paths. For example, in a physical server named XYZ, DB1 database system of type oracle 19c patch level 1 is installed in XYZ OS directory/oracle/DB1/1901. DB2 database system of type oracle 19c patch level 3 is installed in XYZ OS directory/oracle/DB2/1903. DB3 database system of type ORACLE 19c patch level 21 is installed in XYZ OS directory. To further isolate labs within the same server, containers such as docker can be used to further isolate labs within the same physical or virtual hosts. OS level isolation is also possible based on an operating system user that owns the database on the server.

It is preferred to mimic the environment of the production for most of the feasible aspects of the teachings herein. Simulating database patching in a test database lab using a container environment while the production is running without container may not provide reliable results. Accordingly, the description above is provided to cover wide varieties of scenarios that may exist in respective cloud environments.

Moreover, a clone of the lab can be achieved at a container level, virtual machine image level, or filesystem level. The clones of the lab can be saved in disks in any of these forms to save the base levels before reusing the lab resources. Alternatively, the lab can be destroyed given a source image with base patch level is available. A clone of the database base lab is preferred because the patching could fail during the test. If the patching was applied on the base, then the lab would not be usable until the root cause is identified. However, if only the clone was patched, then the base can be used to test fixes and other patch levels by generating other clones and simulations.

Provided the patching process is successful, a rollback process is initiated. Provided the rollback process is successful, the clone is destroyed. In one or more implementations of the present disclosure, following a successful patching process, the model associated with the patch is released to production patching engine 114 and the patching repository is pushed to production repository by production patching engine 114 in one or more implementations of the present disclosure.

Continuing with reference to the example implementation shown in FIG. 1, in case of a failed event, such as a failed patching process or failed rollback, one or more computing devices automatically generate and/or transmit a notification representing the failed step, which is received by a computing device operated by a service reliability engineer (SRE) 116. The service reliability engineer 116 reviews implementation steps, the model and the target system to determine the root cause of any patching/rollback issues. Once identified, the root cause can be embedded in the model for future optimization and automatic handling. This is also applied in the service zone 118 after the release of the patch to tenants 104.

In one or more implementations of the present disclosure, test patching engine 108 is regularly refreshed by production patching engine 114. The refresh can be global for all database system types and releases or, alternatively, for specific database types and releases. In one or more implementations, the refresh occurs by exporting a configuration in, for example, XML format, and thereafter by importing the configuration to test patching engine 108. The database patching model can include one or multiple steps, which are associated with parameters. Moreover, as known in the art, models and steps are associated with "constraints," which set limits and conditions that govern for executing models and steps. For example, a model is notified of a current type, release, host, operating system of the database system. By using constraints, for example, the type of operating system applicable for this model, and the type of database or the applicable database release for the patch are specified.

Figure 2:
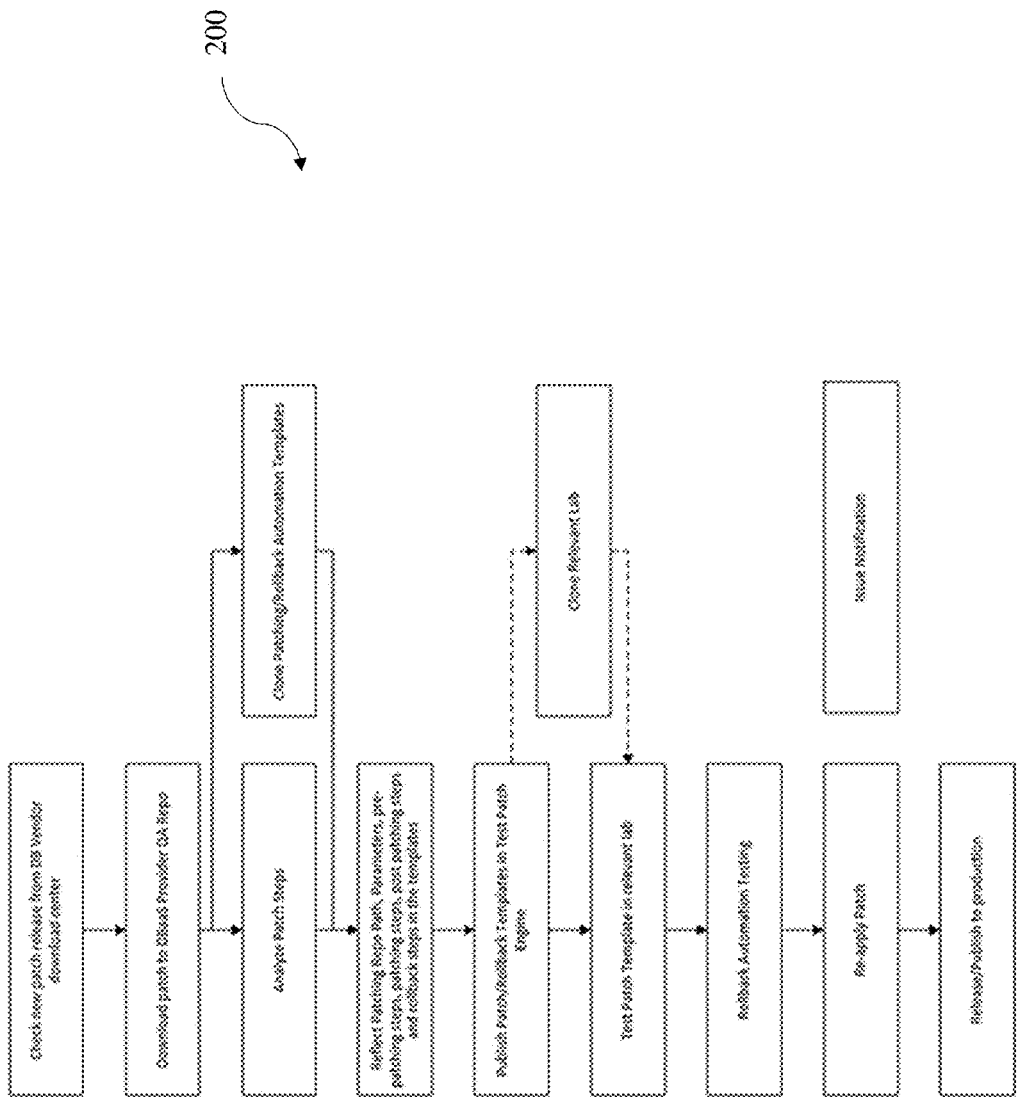
FIG. 2 is a flowchart illustrating example steps associated with a database patching quality assurance process, in accordance with an example implementation of the present disclosure.

Referring now to FIG. 2, steps 200 associated with an example database patching quality assurance process are shown. In the example process shown in FIG. 2, the parameterized patching model is tagged as production ready and ready for use by production patching engine 114. Based on one or more implementations, the cloned patching process model is parameterized and customized for one or more specific patch levels. The parameterized patching process model is associated with specific database type and released based on the constraints defined in the model. Once parameterized, the model can be published in test patching engine 108 to execute against a lab. One or more computing devices preserve database versions of the lab, for example, by executing one or more instructions that clone the lab. Accordingly, one or more computing devices automatically trigger patching in the lab.

In the event that patching is successfully triggered, one or more computing devices can apply a parameterized rollback patching template to a respective lab database, and the patch can be applied again to the managed system. In case of failure at any step, one or more computing devices can automatically generate and/or transmit a notification to, for example, SRE 116 for further investigation and to update the standard patching process model abstract if applicable. Otherwise, the parameterized patching process model is tagged for production release.

Figure 3:
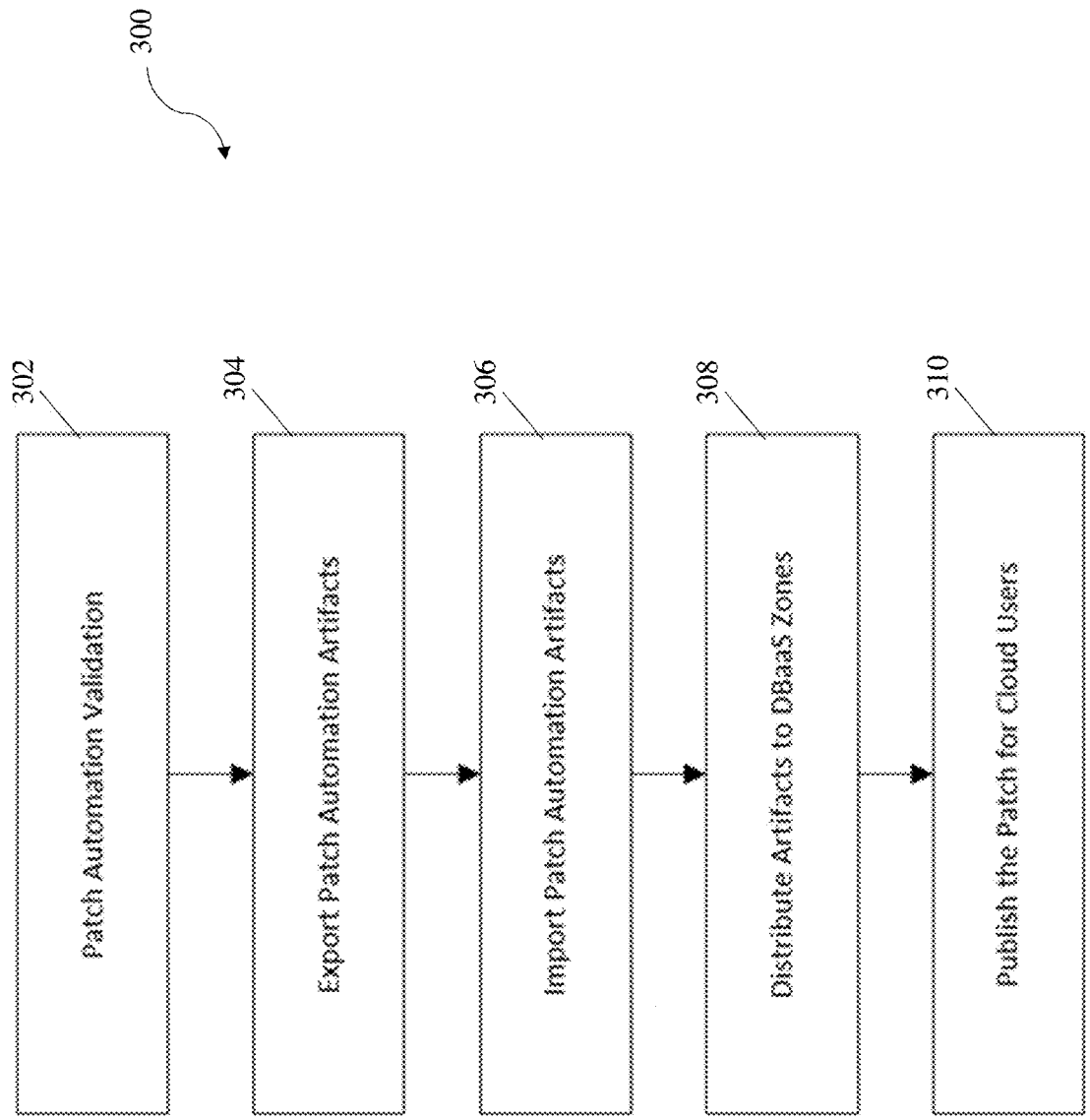
FIG. 3 is a flowchart illustrating example steps associated with production release of a new database patch for a specific database type and release, in accordance with an example implementation of the present disclosure.

FIG. 3 is a flowchart illustrating example steps associated with production release of a new database patch for a specific database type and release, in accordance with an example implementation of the present disclosure. In one or more implementations of the present disclosure, patch automation validation 302 can be automated in a series of steps executed automatically by one or more computing devices that successfully test, roll back and re-apply a patch by test patching engine 108 in the test zone 112 (FIG. 1). As part of the validation, specific commands can be executed against the patched database to confirm accessibility and acceptable performance of standard queries against a benchmark comprising a reference value and critical errors. One or more computing devices can transmit to SRE 116 information associated with the validation for approval of the new patch in advance of importing and applying the patch to production patching engine 114. Once complete, the parameterized patch model can be marked as production ready.

In export patch automation artifacts 304, the parameterized patch model and corresponding steps are exported from test patching engine 108 to QA Repository 110. Production patching engine 114 can execute one or more instructions to monitor the repository for new patches and models. Thereafter, artifacts can be imported to production repository 111 by production patching engine 114 during import patch automation artifacts step (306) provided, for example, one or more computing devices identify a production ready tag. Thereafter, the models are imported to production patching engine 114 from production repository 111. In one or more implementations of the present disclosure, relevant patch packages and automation artifacts are distributed to different zones to avail it to different tenants in the cloud (308). Upon distribution, the patch is released and Published to DBaaS users (310).

Accordingly, the patching model shown and described herein can be configured to include multiple sub-models and steps. Furthermore, a patching model for specific database types, releases, environments, and patches is cloned from an abstract patching model and parameterized to reflect the unique requirements of each patch while applying the standard general requirements that are applicable for each patch. Abstract model is re-engineered and optimized based on observations and evolution of database systems.

In one or more implementations of the present disclosure, a patching process is sub-divided into uptime and downtime processes, which can minimize downtime and expose patching application issues without impacting database service availability. Further, these processes are executed automatically by one or more computing devices, which reduces complexity of the patching process if otherwise performed manually. Based on observation and measurements, by automating and orchestrating the process steps via production patching engine 114, a likelihood of human error associated with manual implementation of a patching process, such as related to database service outages, is minimized or eliminated.

In one or more implementations of the present disclosure a unique method for out-of-place patching can be performed with minimal downtime, including by segregated uptime and downtime sub-processes. Having a time period between the uptime process and downtime process gives an opportunity to investigate and fix issues during the uptime patching in advance of scheduled downtime.

In one or more implementations of the present disclosure, a plurality of database systems can be patched in parallel using the patching system. For example, all database systems for a specific tenant can be patched together by orchestrating a single patching operation. Further, patching processes can execute automatically by one or more computing devices, for example, based on security scanning or other suitable system event.

As used herein, the term "database home" refers, generally, to a location of database system software, such as binaries, configurations or libraries, excluding datafile or redolog files. A database home can also represent engine software that is usable to manage the data in the database, such as referred to in an ORACLE database environment including "ORACLE_HOME" representing Oracle system binaries. In operation, a system is started from a database home and contains one or more packages that are useable for managing the database system. The database system processes can be initiated from the database home directory and, once initiated, the datafiles of the database are read.

One of ordinary skill in the art will appreciate that database configuration files can be located in the database home or, alternatively, in one or more database home subdirectories or in one or more other directories.

In addition to "in-place" patching, the present disclosure supports "out-of-place" patching, which may require additional storage space in the database server that hosts the database system, as each patching includes generating a new database home. In one or more implementations, out-of-place patching is preferred for reducing patching downtime and outages attributed to patching issues. As noted herein, a database home may not include the datafiles which are usually large and updated during the uptime or the redologs which are updated during the uptime as well. During uptime processes, a clone of the database home is patched. Thereafter, during downtime processes, the database system can be stopped and started using the new database home located in a new path. Data files are typically not touched as part of this process.

After successful uptime patching, downtime patching can be triggered as follows. The running database system is stopped and started using the patched database home. After starting the database using the new database home, online patches that update database datafiles can be applied. To simplify the switch, a link (e.g., "/oracle/DVC/19") can be created that points to another (e.g., "/oracle/DVC/1900_0223"), during the uptime and, thereafter, is relinked to point to another (e.g., "/oracle/DVC/1900_0523"), during downtime processes. Similarly, processes such as this relinking can be utilized in case the datafiles are located inside database home, such as can be found in POSTGRES database types.

Given that the new database home is patched and also the old database home is preserved, as it could be used as part of the rollback process in case the patch caused an undesirable side effect, extra storage space is required to accommodate both database homes. In ORACLE, for example, around 20 GB is necessary. 10 GB for the old and 10 for the patched one. For the next cycle, additional 10 GB is needed. The point here is to automate the housekeeping process of unused database homes after successful patches. In addition, if a security patch is applied to the new database home, the original, unpatched and vulnerable database home remains on the server. In accordance with the present disclosure, the unpatched database home is removed as part of the patching cycle. Although the unpatched database home could be removed immediately after successful patching and completion of downtime patching process, it is not removed immediately due to the possibility of undesired side effects of the patch appearing after starting the database and conducting business transactions. By maintaining the unpatched database home, rollback can be achieved with minimal downtime.

Figure 4:
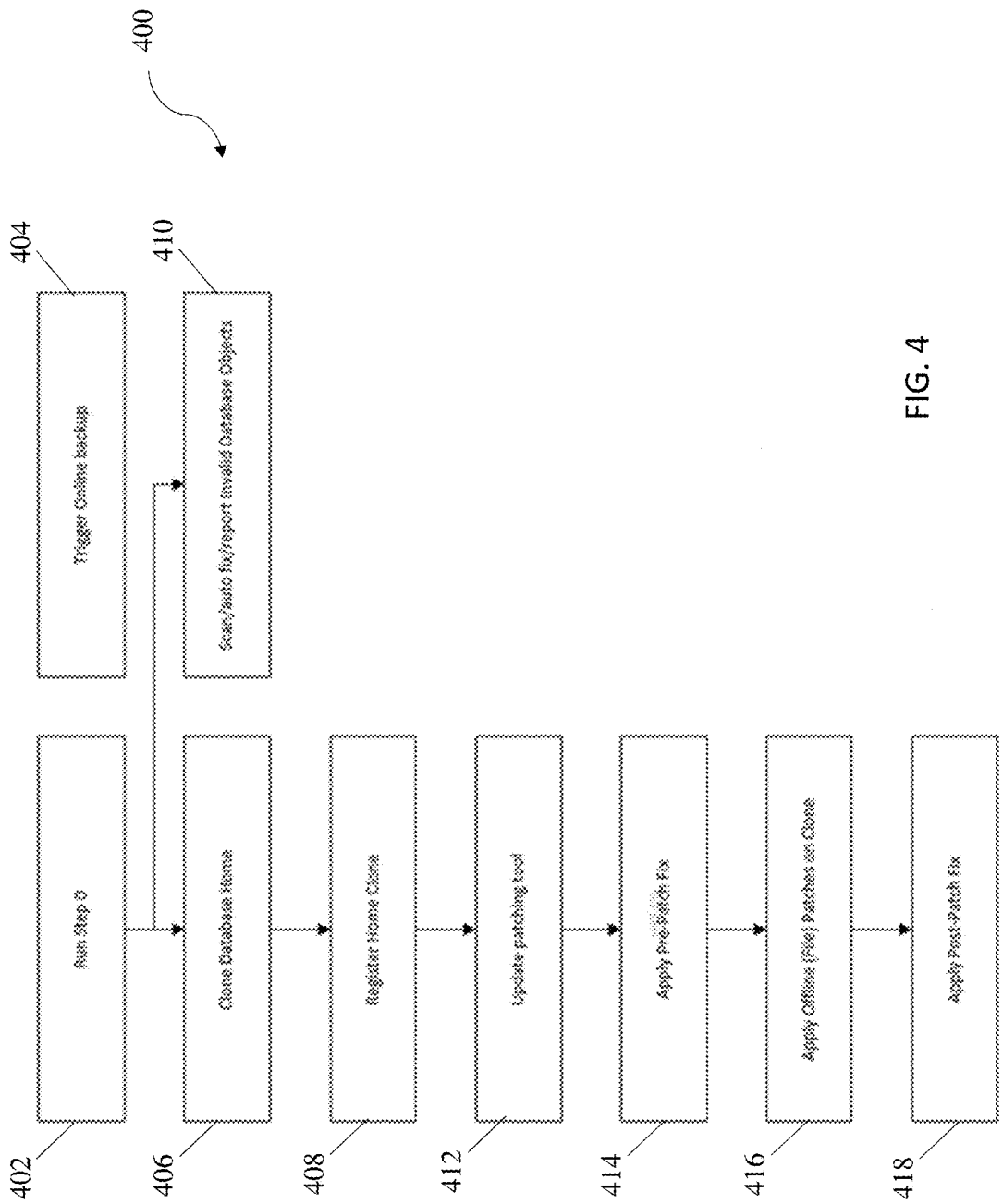
FIG. 4 is a flowchart illustrating example steps associated with an uptime process, in accordance with an example implementation of the present disclosure.

FIG. 4 is a flowchart illustrating example steps associated with an uptime process, in accordance with an example implementation of the present disclosure. At step 402, a "Run Step 0" process is triggered. Server is scanned automatically for historical implementation of patches. Previous patches stored on one or more computing devices are cleared automatically while the main usable home (e.g., the location where the database patches are stored) is kept intact. After successful implementation of a patch or patch set, the previous home is maintained, for example, to enable rollback in the event one or more issues are discovered during or following patching. Storage capacity is analyzed as part of "Run Step 0" against available storage and a space requirement for the patch is calculated during a preparation process for a database patch as a service. Other "Step 0" preparation requirements can include checking operating system user environment requirements, package requirements, temporary space requirements and accessibility of the patch packages in the repository. Moreover, self-healing can be enabled for standard requirements while a notification is sent in the event Step 0 requirements are not satisfied automatically.

In one or more implementations of the present disclosure, an online backup of the database and transaction logs is saved in the server or centrally 404. This is useful to accelerate rollback processes, in the event a critical issue is discovered and remediation technologies such as flashback and snapshot technologies are not available. At step 406, clone database home, the running database system software is copied to a new destination. For example, files, ownerships and permission are maintained during the cloning process. Alternatively, a new database home can be installed, which reflects the release of the running database system. In one or more implementations, cloning can refer to executables and libraries of the database systems, which are updated as part of uptime patching. Cloning of datafiles or redo logs may not be necessary as part of this step 406, and would be inefficient in terms of resources. It is recognized herein that configuration files could be copied as part of the process in view of their relative small size.

In one or more implementations of the present disclosure, a patched database system software package is extracted to a new destination in the database server during the uptime process. In operation, one or more computing devices prepare a patched database system in an environment that mimics a current database system environment, thereby minimizing the impact of patching during the patching process in a live system. Patched database system software can be prepared by a database system provider, which is then downloaded to the local repository and extracted in a new destination during the uptime process.

Continuing with reference to FIG. 4, in one or more implementations of the present disclosure, the database server is cloned and a twin of it is generated (406). The database system twin is then patched. The software of the database system is packaged from the twin and copied to the source system to a new filesystem destination during the uptime process. In one or more implementations of the present disclosure, after copying the new database system software to a new home, or extracting the patched version, post clone activities are required, including register home clone step 408. For example, specific database system types should be registered in local or remote inventory. Specific database systems depend on operating system libraries. In that case, the cloned home is relinked with operating system libraries in the server after the clone.

In one or more implementations of the present disclosure, logical aspects of the database are verified during the uptime process. Critical database system conditions can lead to patching failure including, for example, invalid database objects in database dictionary, which require repair or recompiling. If not resolved, one or more computing devices can automatically generate and/or transmit a notification, which is received by SRE 116. Depending on investigation, the condition fix is coded and augmented to "scan/auto fix/report invalid database objects" (410). In this case, the patching tool can be updated and such condition(s) can be handled automatically in future executions during uptime without human intervention.

In one or more implementations of the present disclosure, patching can be done using tools provided by the vendor. Examples of these tools are OPatch, MOPatch, and HANA Database Lifecycle Manager. These tools may have different lifecycle management release strategy, compared to the patches of the database systems and released. The update of these tools happens during the uptime process in update patching tool step (412).

Due to agility requirement to release security fixes or bug fixes urgently, full quality assurance checks by the vendor may not be achieved for all scenarios, thereby leading to patching implementation errors or side effects. This could be also attributed to special environment specifications in the customer tenant, datacenter or cloud service provider servers. In one or more implementations of the present disclosure, a special step "Apply Pre-Patch Fix" is added to the overall Uptime Process to apply special fix requirements before applying the patch (414). For example, specific security patch mandates can alter permissions of a file temporarily before applying the patch. However, such permission may need to be restored after applying the patch for security or operational purposes. The restoration of the permission happens in "Apply Post-Patch Fix" (418). "Apply Pre-Patch Fix" and "Apply Post-Patch Fix" represent zero, one or plurality of sub-fixes.

"Apply Pre-Patch Fix" and "Apply Post-Patch Fix" steps can be segregated from the standard step "Apply Offline (File) Patches on Clone" step (416). "Apply Offline (File) Patches on Clone" represents the standard patching process released by the vendor or patch provider, documented and implemented using the patching tools described herein. Standard execution steps can be embedded automatically to the automation model by scanning implementation steps provided by the vendor. On the other hand, "Apply Pre-Patch Fix" 414 and "Apply Post-Patch Fix" 418 are engineered by SRE 116 to automate special pre-handling and post handling operations associated with a specific environment, which can be applicable to multiple patch versions of different database releases and types. Moreover, constraints can be associated with each fix to be confined to the environment(s) where it should be executed. In the event no constraint is defined, then it should be applicable for use with all patches.

Generally, and for purposes of clarity, "Apply Pre-Patch Fix" 414 and "Apply Post-Patch Fix" 418, handle aspects related to database system software files and packages patching. Alternatively, "Scan/auto fix/report Invalid Database Objects" 416 addresses logical issues, such as invalid database objects, which require recompilation or special logical fix.

Figure 5:
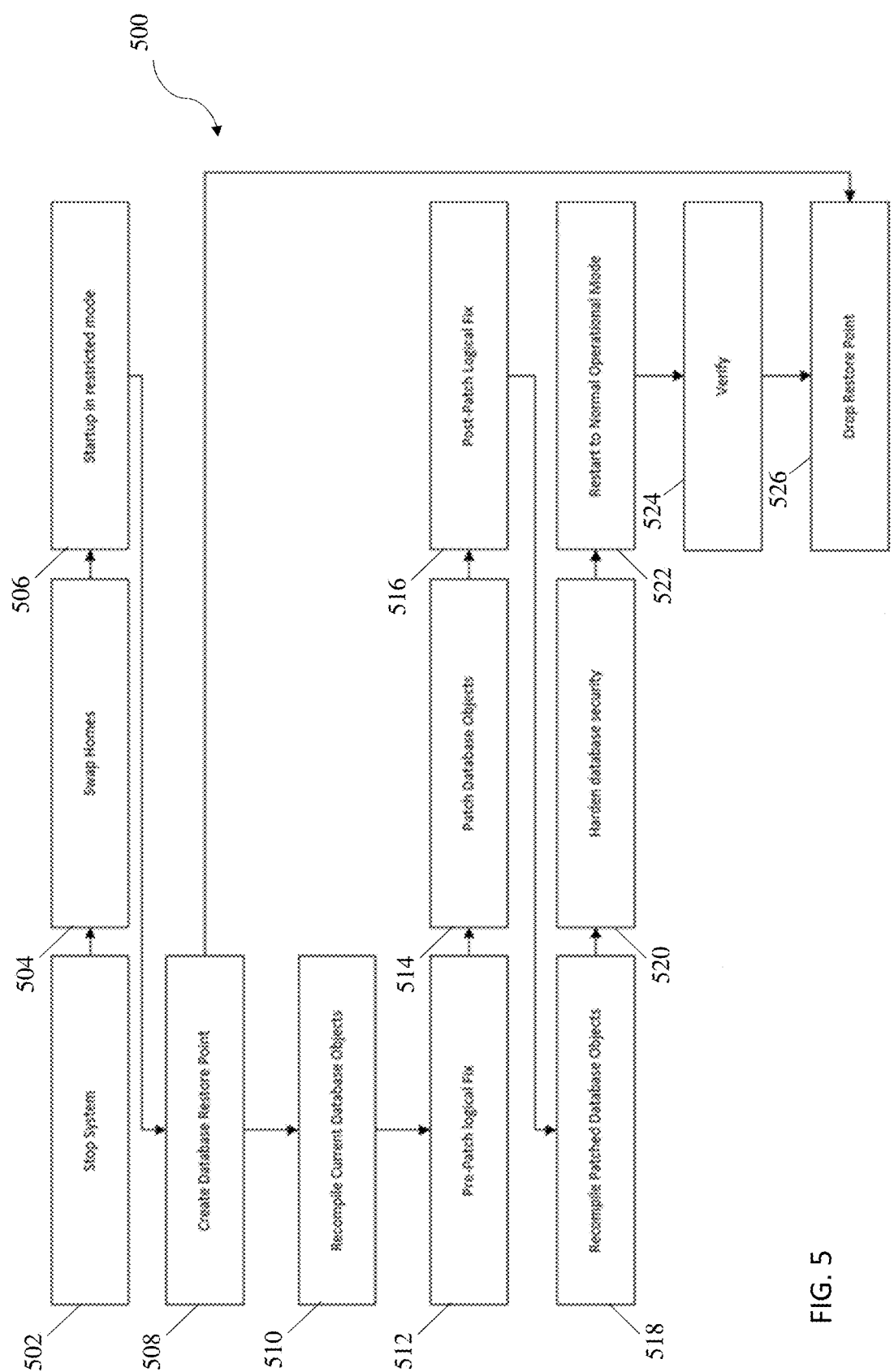
FIG. 5 is a flowchart illustrating steps associated with downtime processes, in accordance with one or more implementations of the present disclosure.

FIG. 5 is a flowchart illustrating steps associated with downtime process 500, in accordance with one or more implementations of the present disclosure. In one or more implementations, downtime process 500 is triggered after a successful uptime process 400, either immediately after the uptime process 400, based on an event or scheduled job, or manually. In one or more implementations, specific database patches are applied in cases where there is no business transaction on the system. In Stop System (502), connected applications or clients to database system are stopped or disabled. After stopping the database systems, the new patched home that was prepared during the Uptime Process illustrated in FIG. 4 is enabled for use by the database system.

In embodiments of this invention, SWAP Homes (504) is implemented using different approaches, such as a link at the operating system layer, where the specific link for the release is utilized to identify the usable home. During this step, the link can be pointed to a new patched home. Alternatively, or in addition, the old home is renamed and marked for rollback while the new home is assigned the usable home's name. This can be done, for example, by renaming at a folder level or mount point level in operating system filesystem.

In Startup in Restricted Mode (506), a database system is protected from executing transactions by clients or batch jobs. This can be achieved by a restricted option executing during a start process of a database system. Alternatively, a database system can be fenced by a firewall, for example, at the operating system level. Background jobs on the server can be disabled in order to prevent automatic triggering of database jobs. Moreover, connectivity to a database can be restricted, such as by terminating client tools for specific types of database systems such as ORACLE. For database systems used in 3-tiers scenarios, such as where the database system is accessed by an Application Server in specific types of ERP systems, the database system can be isolated by stopping the application server.

Continuing with reference to the flowchart shown in FIG. 5, Create Database Restore Point (508) can simplify and accelerate rollback processes automatically, such as in case of patching failure or side effects. Step 508 can occur, for example, using guaranteed restore point concept, for example; in ORACLE database systems. In operation, production patching engine 114 can transmit a restore point name to an executable at the server, which can create a restore point. In database systems where such technology is not available, an alternative approach is supported by creating an image (e.g., a snapshot) of the database system, such as at storage level or file level. Changes made to a system following an image can be tracked to accelerate the rollback by restoring the state of the database system at the instance of taking the snapshot. Alternatively, in cases where flashback technology and snapshot technology are not available, a rollback approach for logical changes can be achieved using backup and restore processes. Online backup can be initiated, for example, during Uptime Process 400 to minimize the Downtime Process 500 and possible service impact, as described herein. Backup of data and transactional logs can be saved locally or centrally, for example, based on backup system the performance. Further, the option to keep data and logs backups in nearline storage in specific implementations can be used to accelerate rollback processes, as well as to verify availability of rollback options.

Continuing with reference to FIG. 5, Recompile Current Database Objects (510) can be included to prepare logical database objects for patching. Due to security hardening or administrative activities on a database system, specific system objects can become invalid. Accordingly, in one or more implementations of the present disclosure, recompiling can be added to minimize the risk of failure. Examples of such preparation activities include running of catalog, catproc and utlrp scripts in Oracle Database systems. In certain database systems that do not require such recompilation of logical objects, Recompile Current Database Objects (510) can be omitted.

"Pre/Patch Logical Fix" (512) can be added as a place holder for executing fix scripts on database systems that are not included as part of standard steps provided by a patch supplier. Recompile Current Database Objects (510), for example, does not operate to validate all invalid objects in data dictionary. Accordingly, specific steps can be executed to address such special requirements. In one or more implementations of the present disclosure, SRE 116 can augment this step by fix code based on test and practical implementations of patches that can be used to address similar issues in future patches. Constraints can be used to limit the scope of fix codes to execute on target database systems based on satisfied conditions, such as release and other operating system environments.

Continuing with reference to FIG. 5, Patch Database Objects 514 automatically applies standard database patches, such as based on vendor implementation guide as described herein, and Post-Patch Logical Fix 516 can be automatically applied. In the event of failure, one or more computing devices can generate and/or transmit a notification and, in response, an automatic rollback process can be initiated. As part of the patching process, specific database objects are invalidated. In Recompile Patched Database Objects (518), the status of one or more database objects is validated and recompiled/reactivated, if necessary. In Harden Database Security (520), a security baseline defined by the organization or tenant 104 can be re-enforced. As part of the patching process, a privileged account can be activated or control is loosened to enable successful patching process. In specific implementations, default permissions provided by the vendor is assigned to objects or files. These default permissions may violate a security standard defined by a service provider or tenant 104. Depending on a particular patching implementation, parameters can be enabled or disabled and, accordingly, one or more sub-processes can be triggered to harden the security as part of post patching activities (FIG. 6).

Continuing with reference to FIG. 5, "Restart to Normal Operational Mode" (522) reverts the previously executed Startup in Restricted Mode (506), which was enabled prior to patching. In normal operations mode, access to database systems by general clients and batch jobs clients is re-enabled, the server and network are unfenced, client tools are started, and the application server started in 3-tiers scenarios. Thereafter, a run-time status of the database system is verified (Verify (524)). For example, an average response time following patches being applied is compared against a benchmark. In addition to run-time status, other measurements can be made, such as monitoring business transactions following patching. Moreover, basic verification can be preformed at a step level. For example, in "Patch Database Objects" (514), the status of each patch can be evaluated for success. In "Verify" (524), functionality and performance aspects are verified for the DBaaS.

In one or more implementations of the present disclosure, Drop Restore Point 526 follows after the verification in Drop restore Point steps. Active restore points may increase the load on the database system, consume computing resources or lead to storage resource consumption. Automatic drop or notification of active restore points is required in one or more implementations of the present disclosure. The Downtime Process is marked completed upon this step.

Figure 6:
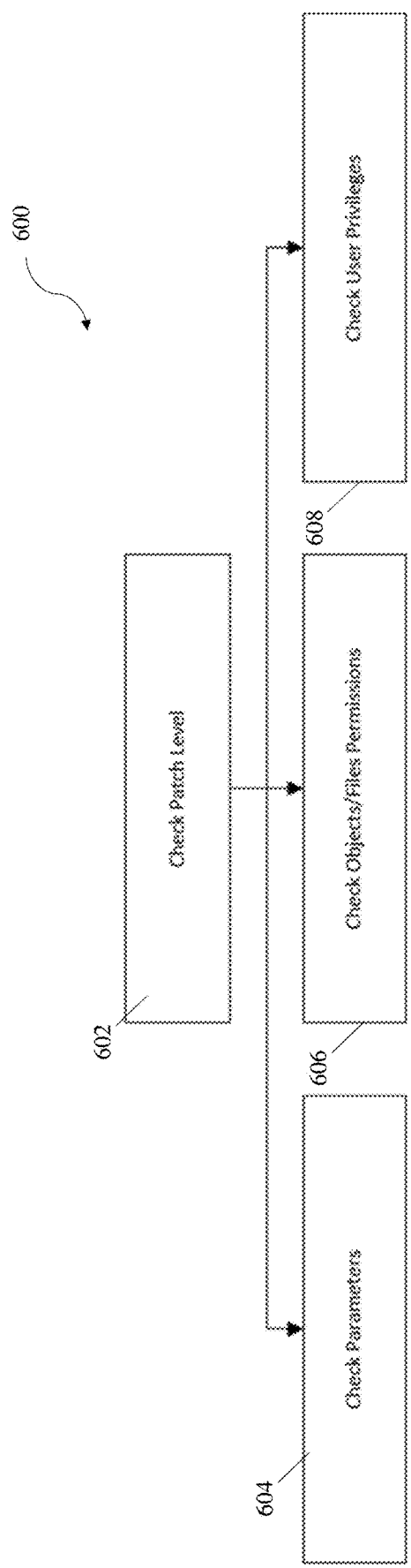
FIG. 6 illustrates a series of checks associated with security hardening, in accordance with an example implementation of the present disclosure.

FIG. 6 illustrates a series of checks 600 associated with security hardening, in accordance with an example implementation of the present disclosure. In the example shown in FIG. 6, checks 600 include check patch level 602, check parameters 604, check objects/files permissions 606, and check user privileges 608. As noted herein, default permissions may violate a security standard defined by a service provider or tenant 104. Depending on a particular patching implementation, parameters can be enabled or disabled. Accordingly, the respective checks 600 can be triggered to harden the security as part of post patching activities.

Figure 7:
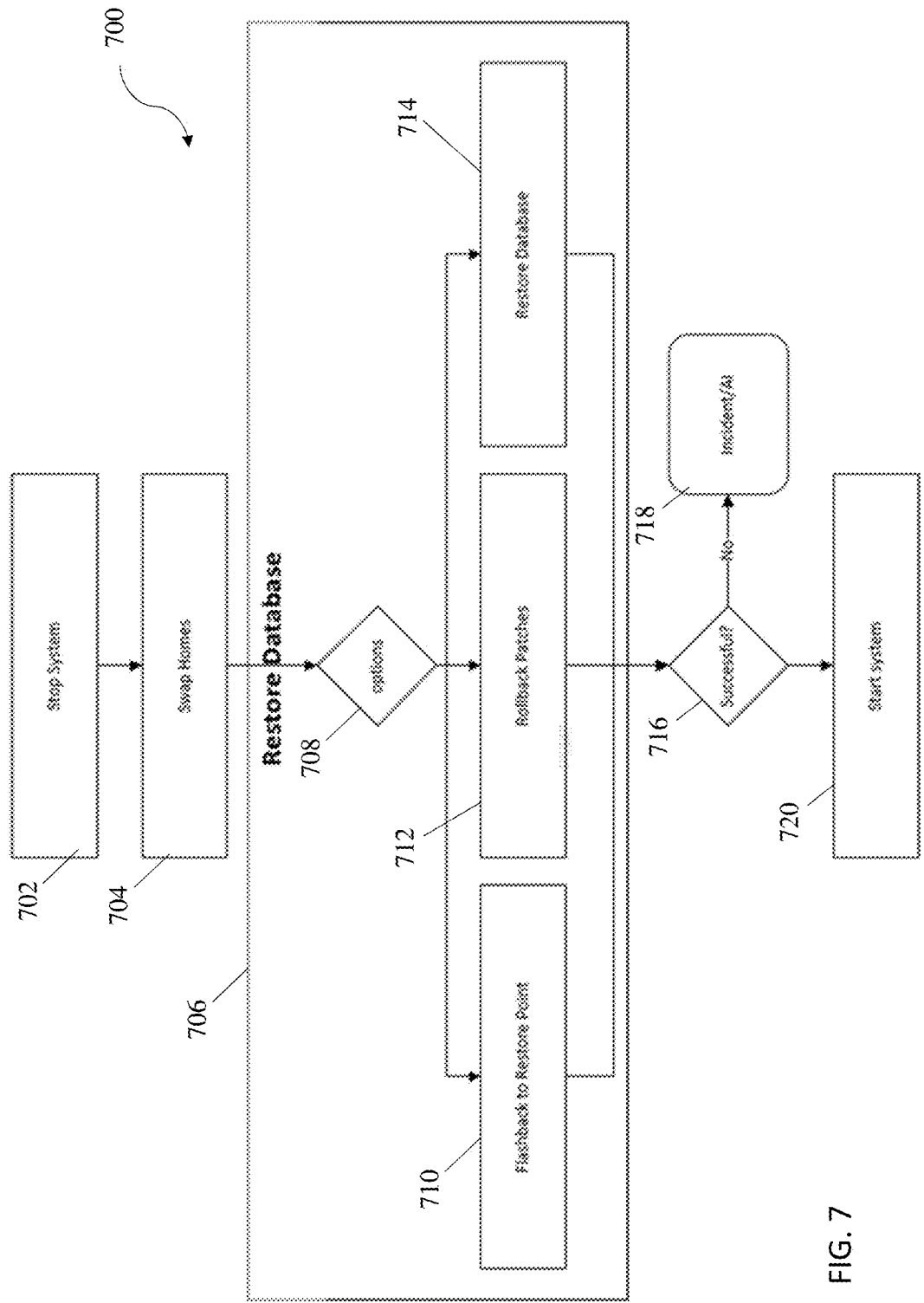
FIG. 7 is a flowchart illustrating steps associated with a rollback process, in accordance with one or more implementations of the present disclosure.

FIG. 7 is a flowchart illustrating steps associated with a rollback process 700, in accordance with one or more implementations of the present disclosure. As noted herein, database patching may fail or introduce side effects that impact the usability of the database system. In addition, as part of DB Patching QA process, patches can be applied and rolled back several times to enhance the overall process, and failure can be detected in any of the steps. In one or more implementations, automatic rollback and/or automatic notification of failure can be enabled and triggered automatically upon a failure or after a confirmation by an agent. As noted herein, Uptime Process 400 minimizes patching downtime or failure risks. In addition, the automatic rollback process 700 minimizes downtime operations. In combination, the present disclosure provides for significant improvements in efficiency and speed over known database patching.

In addition, database patching failure can be attributed to external factors, such as network failure that occurs during a patching process or running security tools that may block patching activities. The present disclosure provides for automatic and efficient handling in such circumstances, including by reducing or eliminating human involvement.

In downtime rollback 700 process, a database system is checked and stopped in case of running processes (702). This can include dependent clients that are dedicated for the relevant database system. In swap homes (704) of the rollback process, the active home and the old home are both available in the server of the database system. Depending on the approach previously used to swap homes during the downtime patching process 500, the home swap is reverted in this step. If the home swap that was realized using links at operating system level, then the previous link pointing to the patched home as part of the downtime process is relinked to the original home in advance of the patch. In case of a rename, the original home that was renamed and marked for rollback is given the original name after renaming the patched home.

If the patching failed after modifying database system objects as part of the patching, a rollback of these changes should be achieved in order to restore the system to its original state just before the patching process. In restore database (706), several options (708) are available and based on availability, reliability, efficiency and agility of the restoration approach. Options 708 can also depend on an approach utilized during the Downtime Process 500 as part of Create Database Restore Point 508.

In embodiments of this invention, Restore Database 706 is achieved using flashback of transactions 710, database backup or filesystem restoration 714, storage flashback or rollback of patches script 712. Using flashback logs, original states of the objects since the activation are recorded. If a rollback request is received from Patching Engine, modifications since the creation of the restore point are undone.

Database backup restoration is achieved based on storage or file-based snapshots or based on full data backup stored locally or centrally. Restoration from full data backup could take longer time compared to other approaches.

Rollback Patches 712 can be effected through patch roll back scripts associated with patches. Unfortunately, this approach could be considered unreliable. In the event patching itself failed, rolling back the patches using rollback scripts one by one could fail as well.

Upon successful Home Swap (716) and Restoration of Database 706, database system and dependent clients are started to resume the service (720). Alternatively, in the event of an unsuccessful Home Swap, an incident is generated (718).

Physical standby can be supported in different database systems, and the present disclosure includes compatibility between a primary database system and a standby database system during patching processes. In one or more implementations, specific database system types support higher version on the standby system. Synchronization between primary and standby systems can continue following patching of the standby database system. In such case, the standby can be activated and converted to a primary database system, which enables patching of the original primary with reduced downtime. Unlike known patching processes, in which backward compatibility by a standby system is not supported by all database systems types or all types of patches, the present disclosure supports different types of database systems, in which standby patching occurs with minimal downtime.

Figure 8:
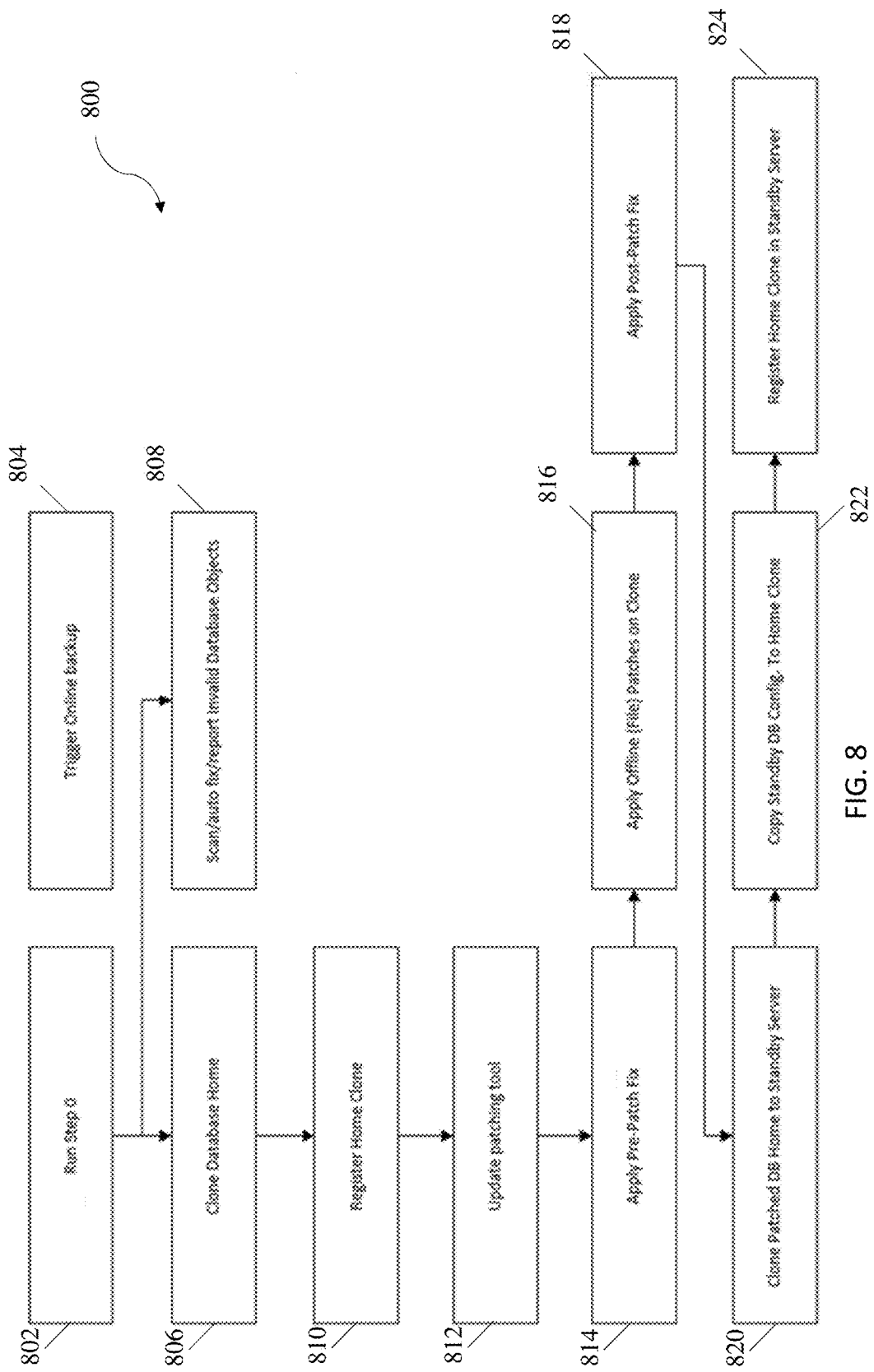
FIGS. 8-10 illustrate example database patching implementations including physical standby, including by leveraging downtime minimization of standalone database systems.
Figure 9:
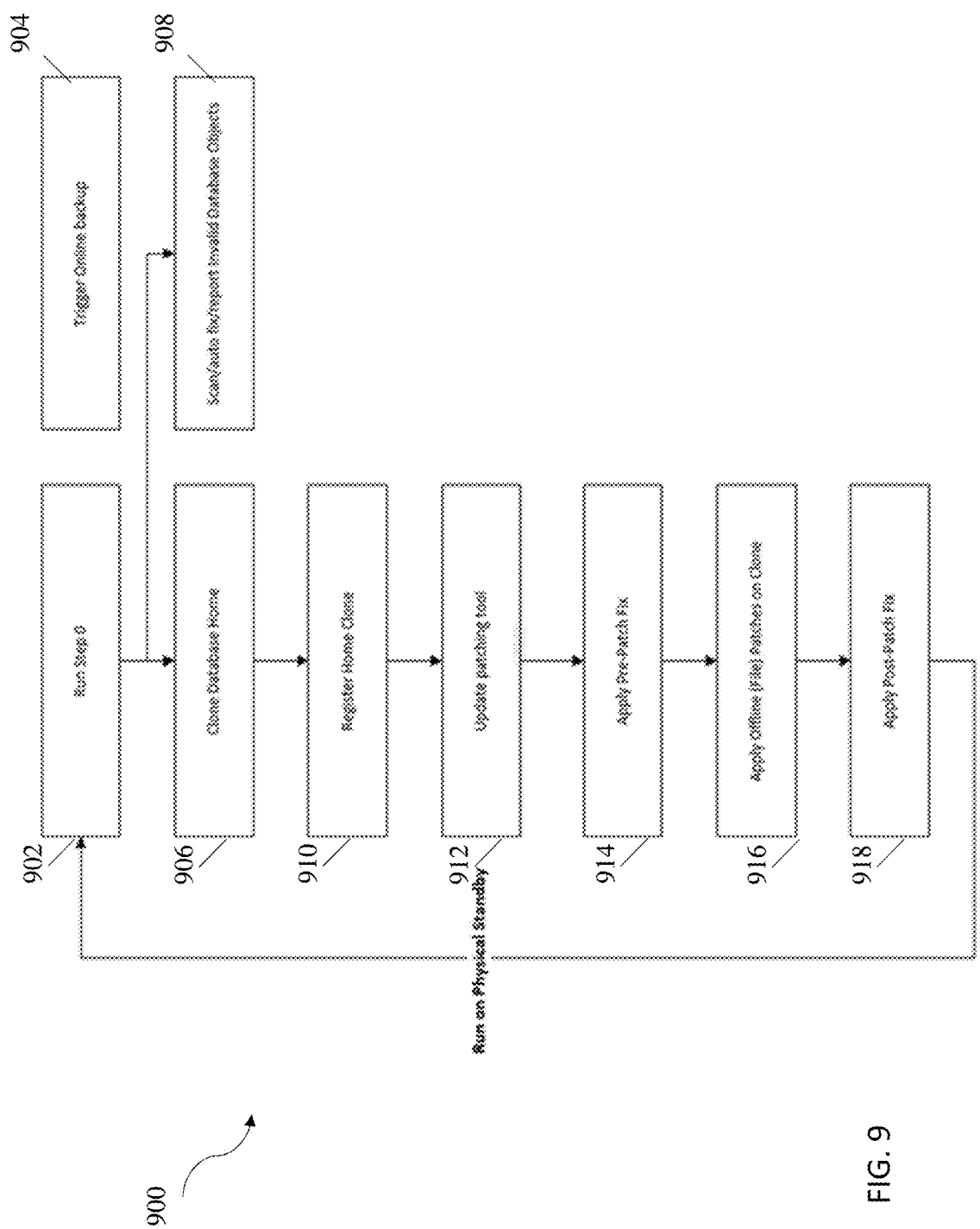
Figure 10:
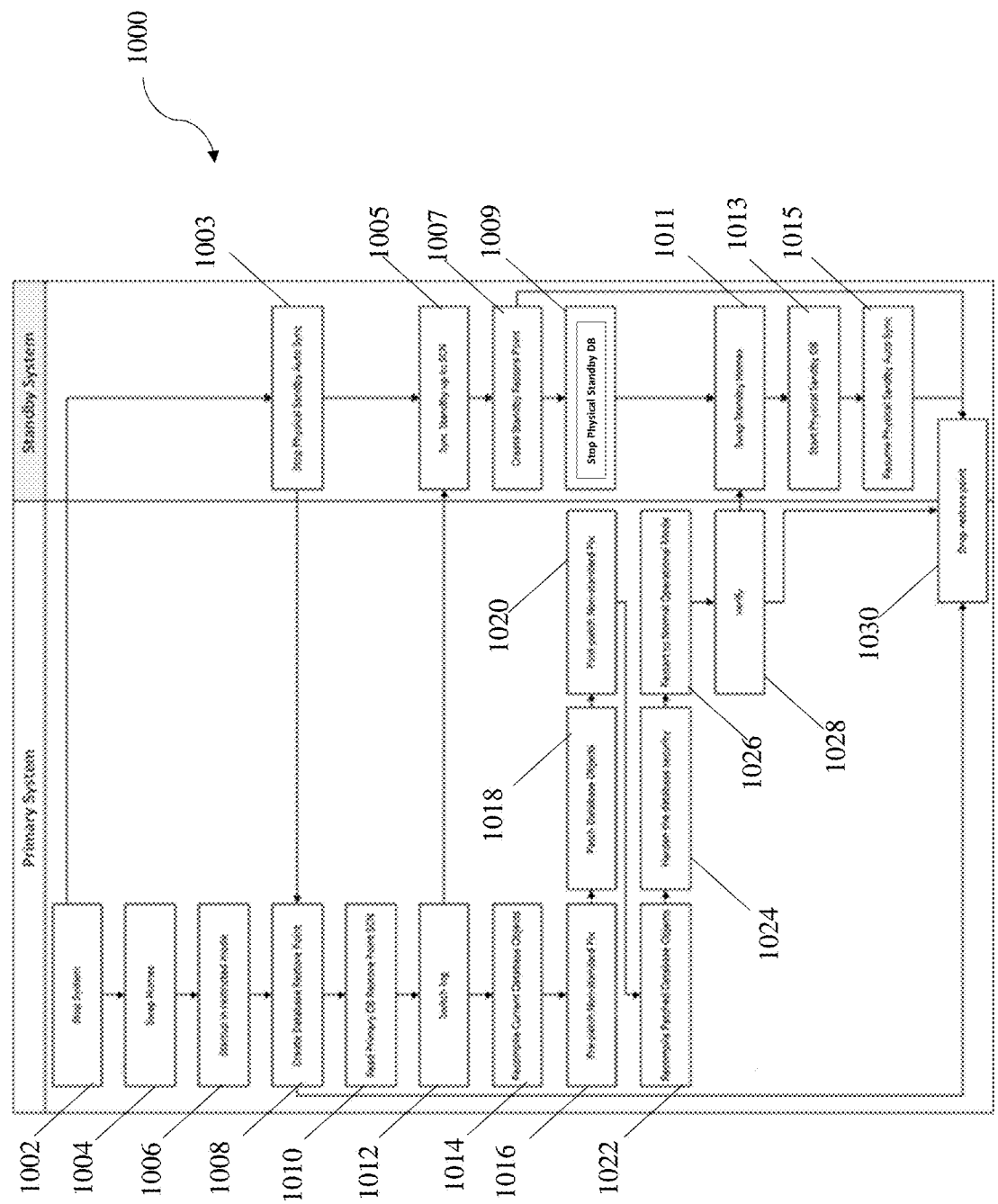

FIGS. 8-10 illustrate example database patching implementations including physical standby, including by leveraging downtime minimization of standalone database systems. With reference to the implementation 800 shown in FIG. 8, the process starts (802) and an online backup is executed (804). After primary database system uptime activities are completed on a cloned home, the patched cloned home is cloned to a standby database server through network or using a shared filesystem (806). The process can be orchestrated by production patching engine 114. The cloned home in a standby database server can be placed in an inactive home and configuration information associated with a primary site made available in the standby server. Configurations can, thereby, be replaced with standby configurations. Such configurations reflect unique setup of a standby database system such as standby parameters, network related parameters and tuning parameters. During the uptime, parameters files in the standby database system home are copied to the patched cloned home in the relevant destinations.

Continuing with reference to FIG. 8, after the database home is cloned (806), a scan for invalid database objects is made, which automatically fixed and reported (808). Thereafter, the home database clone is registered (810) and the production patching engine 114 is updated (812). Thereafter, the process continues to applying any appropriate pre-patch repairs (814), applying any offline (file) patches on the home clone (816), and applying any post-patch repairs (818). From there, the patched database home is cloned to a standby server (820) and the standby database configuration is copied to the home clone (822). Thereafter, the cloned home is registered in the standby server (824) and linked to its library, as needed.

FIG. 9 illustrates an alternative implementation 900, which can be orchestrated by production patching engine 114. The process 900 can be orchestrated by Patching Engine and, unlike process 800 shown in FIG. 8, the redundancy of a cloned home to a shared storage is eliminated by process 900, which results in less network overhead. Further, process 900 can be executed in standby server upon successful uptime patching of the primary site and can be applicable to plurality of standby database systems and run in standby systems in parallel or in sequence in instances where a database system has multiple standby systems.

In the example implementation (900) shown in FIG. 9, the process starts (902) and an online backup is executed (904). The database home is cloned (906) and a scan for invalid database objects is made, which automatically fixed and reported (908). Thereafter the database home clone is registered (910) and the production patching engine 114 is updated (912). Thereafter, the process continues to applying pre-patch repairs (914), applying offline (file) patches on the clone (916), and applying post-patch repairs on the clone (918).

FIG. 10 illustrates an example implementation 1000 illustrates an example downtime patching process with physical standby. The process 1000 requires only minimal downtime to complete patching activities in systems with physical standby. The downtime is triggered after successful completion of uptime activities. Patching Engine communicates with Primary system to stop operations. This process is then branched to run in parallel in the primary and standby database system. Patching Engine controls the orchestration process.

After stopping the primary database system in the primary database system process branch (1002), the database system active and patched homes are swapped, for example by using the swapping methods explained earlier (1004). Thereafter, the system is started in restricted mode (1006) and a restore point is created (1008). The System Change Number (SCN) at this stage is read in the Primary Database system (1010). The production patching engine 114 keeps track of the SCN to be used in Standby Database patching branch. SCN is used to sync standby to the restorable level in case of patching failure. Transactional logs of the database are written to filesystem (1012). If required, logical database objects are recompiled and fixed (1014). Additional prefixes are executed against the primary database (1016). This is followed by database objects patching (1018) post patching fixes (1020), and recompilation for patched objects (1022). Thereafter, the security of the database is hardened (1024). If completed successfully, Database is started and operation is resumed to normal mode (1026). With successful verification (1028), Database Restore Point can be marked for deletion by this branch or sub-process (1030).

In parallel, auto synchronization is stopped in standby system. Physical standby depends on transactional logs (or redo logs) to sync with primary database. After stopping the primary database (1003), the sync of transactional logs is placed on-hold. This is to protect physical standby from reflecting and syncing patching issues in standby server in case of patching failure in the primary database system. Successful auto synchronization stop step status is received by the production patching engine 114 to trigger the dependent activity in the primary database as depicted in FIG. 10, which ensures that standby system is not ahead of the generated restore point which is created to insure quick restoration of the service upon patching failure and continue the standby synchronization smoothly after the rollback in the primary database system.

Patching Engine get the SCN of the restore point from the primary database and initiate a dependent step on standby system to sync up to the restore point (1005). Optionally and in one or more implementations of the present disclosure, a restore point is created in the standby system for additional protection of the database (1007). This is followed by a standby database system stop to prepare for replacing the current home with the new home prepared as part of the uptime activities (1009).

It is recognized herein that providing a restore point in a standby database is particularly useful in case of a restore after detecting major issue after resuming operation of a primary database system and resuming the sync (1015). In the event a decision to restore a primary database following (1015), but prior to (1030), standby syncing cannot be resumed after restoring the primary database, if the standby database was not restored to a restore point similar to production restore point. This is due to the standby system SCN being incremented due to the resumption of syncing after starting the primary. Upon restoring to patching SCN in the primary database, the SCN in the standby database could be ahead and in different branch. To address this issue, restoring the standby database to SCN (1012) is performed, which precludes a need to destroy and rebuild the complete standby database, as well as to resync the standby database with the production database.

Swap Standby Homes step in the standby branch of the downtime patching depicted in FIG. 10 happens after confirming and verifying the successful patching in the primary database system patching branch (1011). Patching Engine Swap Standby Homes using one of the approaches explained earlier and based on database system type.

After the successful swap, the physical standby database is started in standby mode and the automatic sync is resumed (1013). If a restore point was created for the standby database, it is dropped at the end of the process (1030). Dropping the restore Point (1030) may not be performed immediately. Depending on the nature of operation, step (1030) can be triggered automatically after a specific time frame tuned, for example, based on business and resources requirements.

The present disclosure supports several scenarios associated with a rollback process for database systems with physical standby. Rollback decision is suitably taken by production patching engine 114 following the verify step (FIG. 10). In case of verification failure and the primary is to be rolled back, further steps of FIG. 10 are not executed. For example, standby homes are not swapped. A rollback process is triggered. The primary database system is stopped. The primary database home is swapped to activate the home used before the patching. The primary database is restored to the SCN of the restore point. If SCN was not changed, then restoration is not required. Transaction logs generated after the restore point are isolated in both Primary and standby database systems. Then, the primary database system is started with the unpatched home. The standby system is started and sync is resumed. It should be noted that the standby system home was not swapped as part of the patching process. For that reason, standby is started in standby mode and logs from primary database are applied normally in standby after the rollback.

If the decision to rollback was determined after resuming the synchronization on the standby, then the flashback occurs in the standby as well.

Figure 11:
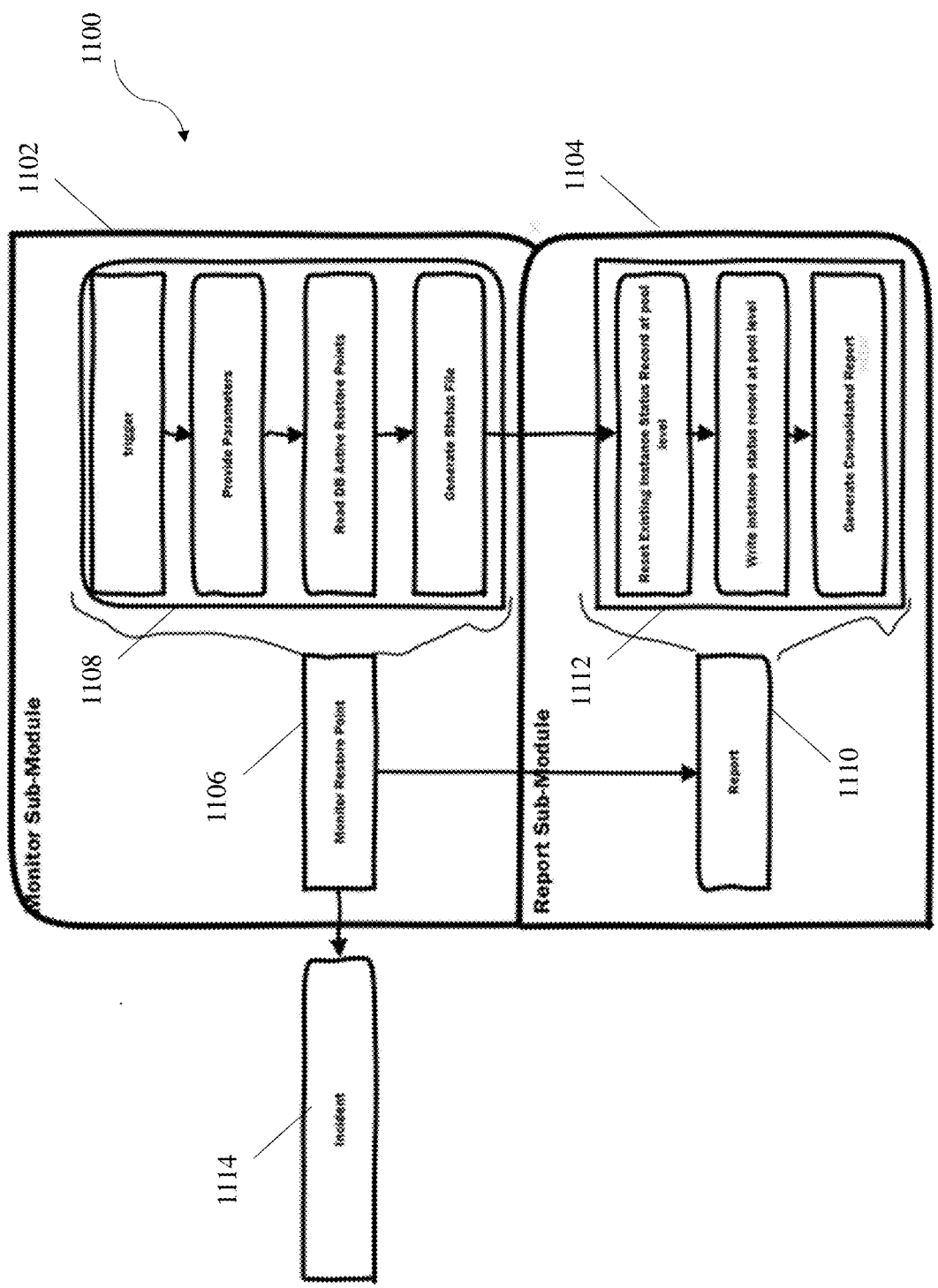
FIG. 11 illustrates monitor and report modules, in accordance with an example implementation of the present disclosure.

FIG. 11 illustrates monitor and report modules (1102, 1104), in accordance with an example implementation of the present disclosure. While restore points are useful to provide agile rollback process with minimal impact on the service, restore points can be an overhead if not handled correctly or there was a failure in clearing restore points. Restore points can consume significant amount of resources and, accordingly, the present disclosure includes special handling of restore points in the context of patching.

As noted herein, the production patching engine 114 supports multitenancy. And each tenant is assigned one database system or more database systems. Monitoring can occur at the micro level of each database instance. Report should be generated at tenant level.

In operation, the production patching engine 114 schedules a monitor job in each database system (1106). The time of the job is not synced. The start of the monitor can be set at any time for each database system. The job executes the check program of the restore point for a specific database. The job can be triggered as a validation operation (1108). This can be for example SQL commands against the database or commands at operating system level. Patching Engine pass parameters to the program including database assigned tenant, notification address of the tenant and the database technical parameters. The program collects active restore points, creation dates and consumed resources of these active restore points. This collected data can be stored in JSON file, in a shared filesystem for a respective tenant along with notification, tenant, host name and database system name. the key of the entry should be a combination of tenant name, host name, database system name and restore point name. The value of the key can include the remaining parameters. This should be updated in a status file. The status file is stored locally or in shared filesystem in embodiments of this invention. in another embodiment, the program returns active restore points data to the production patching engine 114 and assigned to database system in the patching engine. Based on a defined threshold, this generates an incident per database system in one or more implementations of the present disclosure.

Report sub-module (1104) automatically executes a report operation (1110), and independently of the Monitor Sub-Module (1102). Report is triggered against each tenant and generated at tenant level. The production patching engine 114 can be pre-configured and has information of all database systems in all tenants including the assigned tenant and notification address.

In operation (1112), report program reads the status file in each server, reads one status file from a central server for a tenant or collects restore points data from the patching engine in embodiment of this invention. the program has footprint on each server filesystem, on a central server or the Patching Engine. Status data cloud be empty, being collected or collected. Collected data are addressed in the report. Report program parses restore points data and send notification to the relevant tenant. As noted herein, based on a defined threshold, an incident per database system in one or more implementations of the present disclosure can be generated (1114).

Use of monitor and report modules (1102, 11034) can be particularly useful in case real-time data is not required, overhead on database systems is to be minimized or different tenants has different reporting or timing requirements.

In one or more implementations of the present disclosure, a database patching parameterized model (1200, 1250) can be provided for specific database types and releases, and configured automatically. In one or more implementations of the present disclosure, patching models are configured via production patching engine 114. Models can be updated automatically, for example, by scanning patching implementation steps. Specific steps are engineered by an SRE 116 to optimize the patching process or address patching failures as part of QA testing.

Figure 12A:
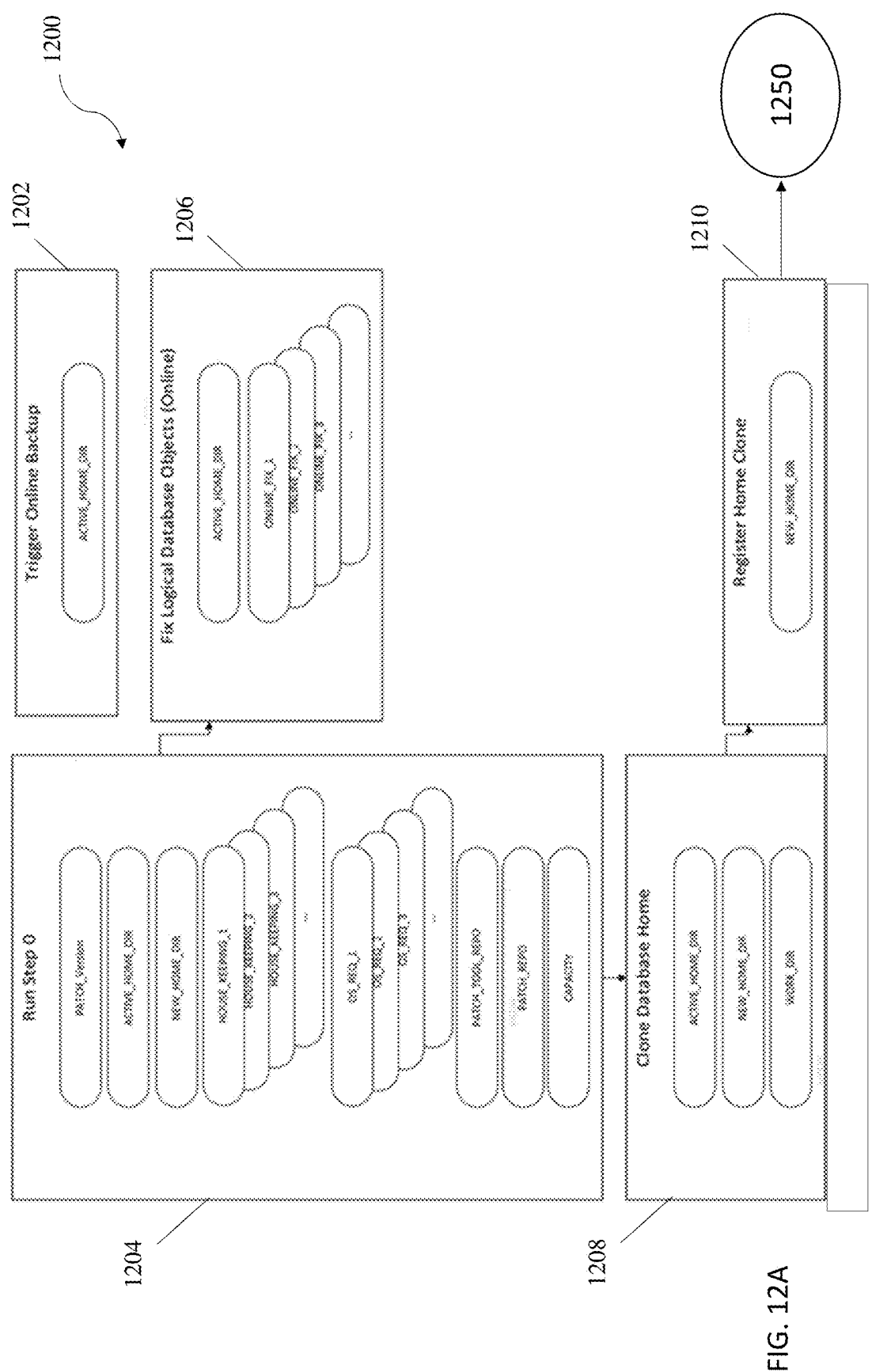
FIGS. 12A and 12B illustrate an example implementation of the present disclosure, including patching model customization/parametrization.
Figure 12B:
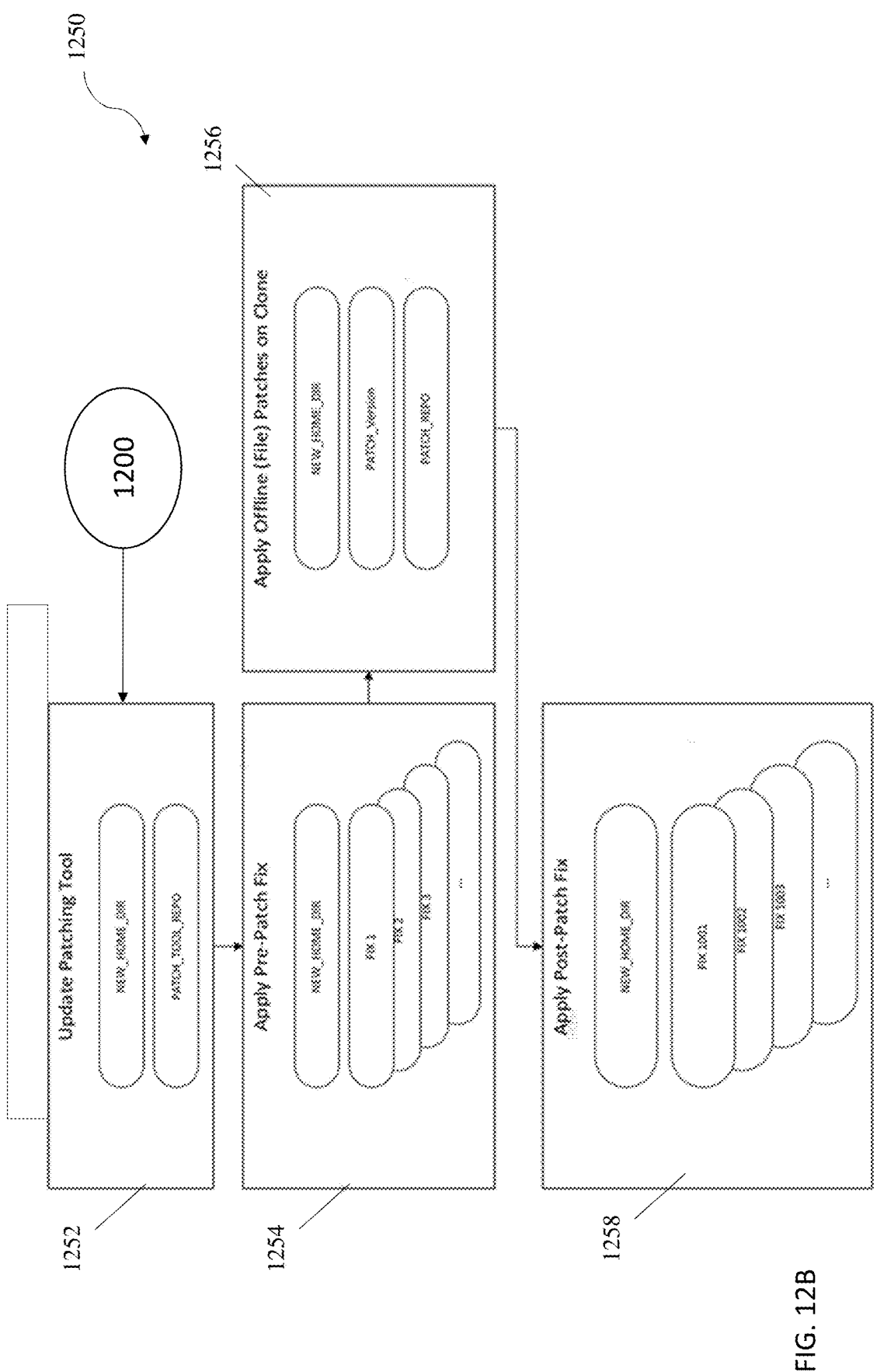

FIGS. 12A and 12B illustrate an example implementation of the present disclosure, including patching model customization/parametrization in connection with an example model. In one or more implementations of the present disclosure, process model (1200, 1250) can be saved physically as an XML file and presented in JSON format. A general model is available for virtually all database system types and releases and is customizable at respective database and release levels. With each patch release, the process can be customized for a specific patch or patch set for a specific type and release. This is useful for cloud server providers offering plurality of database systems of different types and releases, as well as for database service providers offering plurality of database systems of a specific type or release. In one or more implementations of the present disclosure is depicted in FIGS. 12A and 12B, including steps (1200 and 1250). Following an online backup (1202) each step, including initiating step (1204), fix logical database objects (1206), clone database home (1208), register home clone (1210), update patching tool (1252), apply pre-patch fix (1254), apply offline patches on clone (1256), and apply post-patch fix (1258), can include one or a plurality of sub-steps. Each step or sub-step can be associated with 0 or 1 parameter or plurality of parameters.

Steps in the customized model for a specific database type and release are replicated for each patch version. Specific Parameters are updated with each version. For example, the new patched software package location or repository is specified. The parameters associated with the repositories of the patches and tools are updated. Required capacity for the patching process is reviewed based on the QA test tuning.

In embodiment of this invention, HOUSE_KEEPING_*, ONLINE_FIX_*, FIX*parameters depicted in FIGS. 12A and 12B, are realized as parameters. These parameters represent executable fixes with the target code location of a respective fix. For example, the fix can be an executable program available in specific path in the operating system. The parameters can be associated with constraints that specify where these programs are applicable to run. If not applicable, they are skipped. Further, these parameters can be fed by the implementation steps provided by the database patch providers or fed by SRE 116, in case a given patch is related to a unique environment. In one or more implementations of the present disclosure, a plurality of HOUSE_KEEPING_*, ONLINE_FIX_*, FIX* can be defined as model steps with constraints. If the constraints are not satisfied, these steps can be skipped during the run time.

Figure 13:
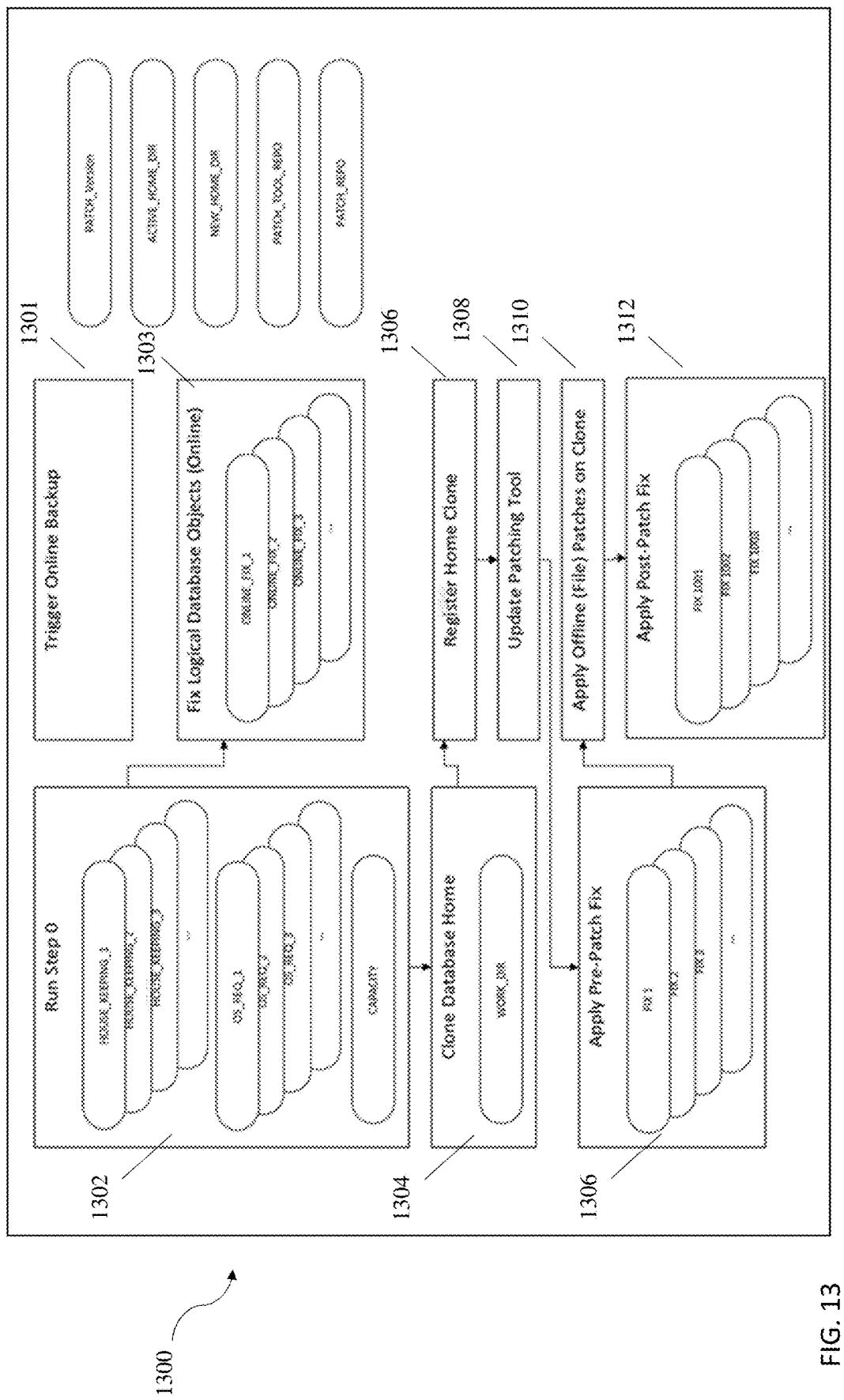
FIG. 13 illustrates a series of steps associated with an example model that is associated with global parameters.

FIG. 13 illustrates a series of steps associated with an example model that is associated with global parameters. Examples of such global parameters include ACTIVE_HOME_DIR which can represent a current software location of the database system in the server filesystem. Such parameters are fed automatically during the run time by the configuration management system in one or more implementations of the present disclosure. specific parameters are customized during design time and specific environment parameters are customized per database during runtime. Full parameterization of the model happens during run time. A design time customized model is required per database system type, release and patch level. Similar to the example implementation illustrated in FIGS. 12A and 12B, steps (1300) included in the model shown in FIG. 13, following an online backup (1301), including initiating step (1302), clone database home (1304), fix logical database objects (1303), register home clone (1306), update patching tool (1308), apply pre-patch fix (1306), apply offline patches on clone (1310), and apply post-patch fix (1312), can include one or a plurality of sub-steps and can be associated with 0 or 1 parameter or plurality of parameters.

Figure 14:
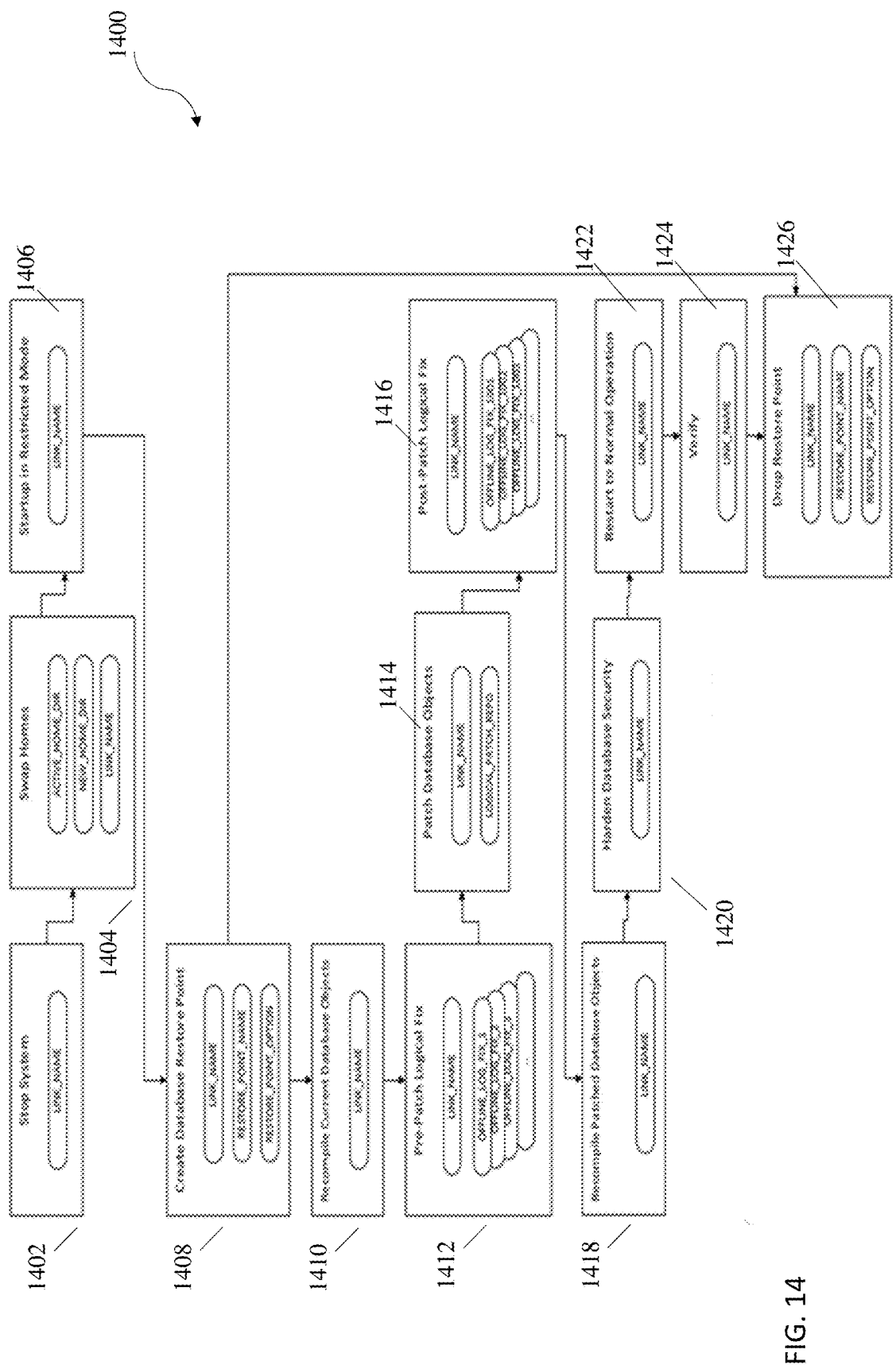
FIGS. 14 and 15 illustrate example implementations of the present disclosure representing steps associated with downtime process parameterization.
Figure 15:
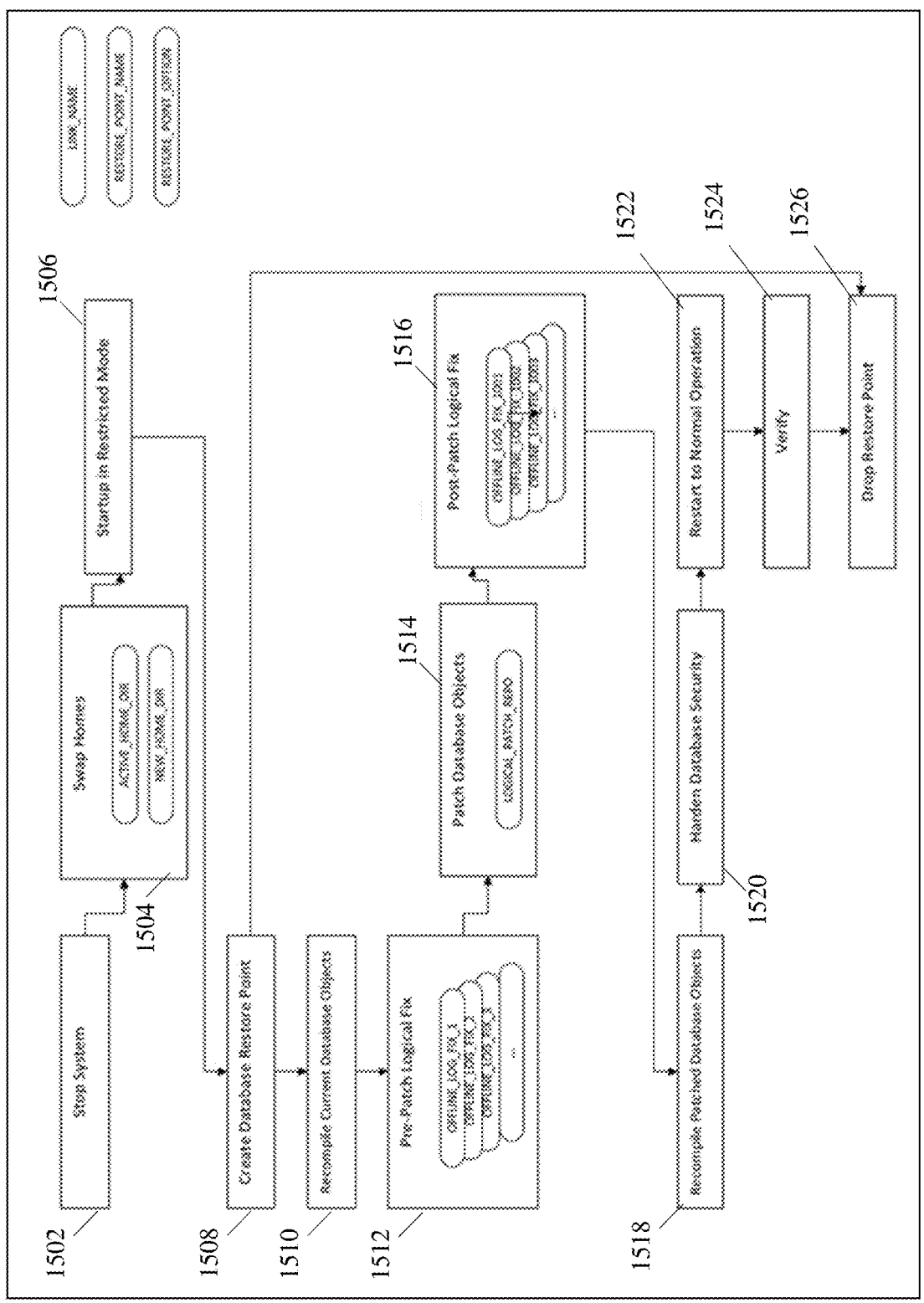

FIGS. 14 and 15 illustrate example implementations of the present disclosure representing steps associated with downtime process parameterization in connection with a respective model. Parameters in the model can be specific to each step or global at the model level. Constraints are associated with steps and executable parameters. LINK_NAME parameter can represent the path of the database system home applicable to the step. In stop system (1402 or 1502), LINK_NAME is pointed to the unpatched home in the filesystem. In Swap Homes (1404 or 1504), the link is pointed to the NEW_HOME_DIR using for instance soft link in Linux by "In-s" command. By that, subsequent steps (including startup in restricted mode (1406 or 1506), create database restore point (1408 or 1508), recompile current database objects (1410 or 1510), pre-patch logical fix (1412 or 1512), patch database objects (1414 or 1514), post-patch logical files (1416 or 1516), recompile patched database objects (1418 or 1518), harden database security (1420 or 1520), restart to normal operation (1422 or 1522), verify (1424 or 1524) and drop restore point (1426 or 1526) can utilize LINK_NAME without a need to explicitly specify the physical path of the relevant home in one or more implementations of the present disclosure.

Accordingly, as shown and described herein, the present disclosure presents method(s) and system(s) for preparing database patching, including by applying database patching as a service for both standalone and distributed computing environments. Implementations of the present disclosure are usable to enhance patching of database systems by organizations utilizing one or more database systems, as well as by cloud service providers offering database as a service ("DBaaS") technology.

Figure 16:
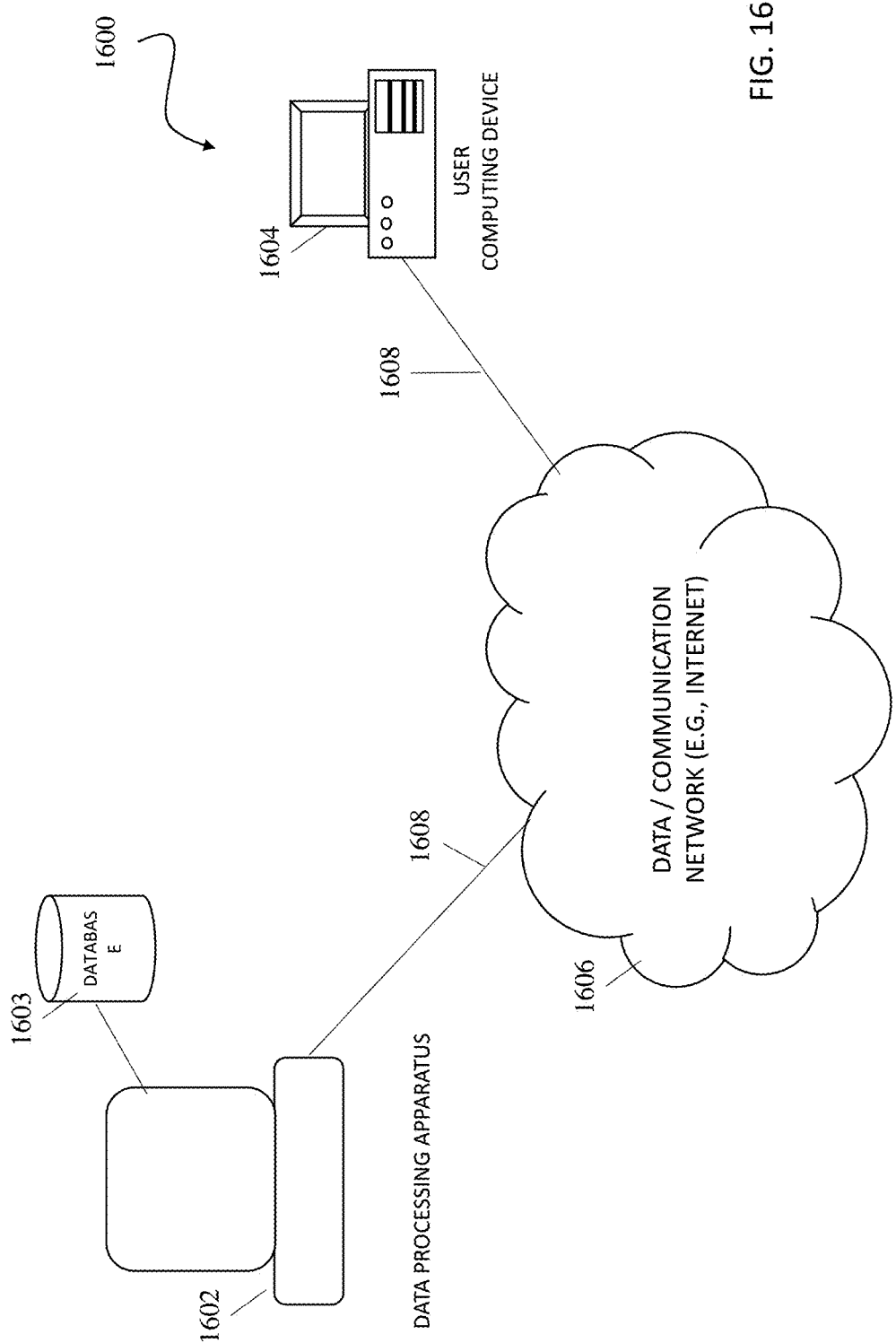
FIG. 16 is a block diagram that shows an example hardware arrangement that operates for providing the systems and methods disclosed herein.

Referring to FIG. 16, a diagram is provided that shows an example hardware arrangement that operates for providing the systems and methods disclosed herein and designated generally as system 1600. System 1600 can include one or more information processors 1602 that are at least communicatively coupled to one or more user computing devices 1604 across communication network 1606. Information processors 1602 and user computing devices 1604 can include, for example, mobile computing devices such as tablet computing devices, smartphones, personal digital assistants or the like, as well as laptop computers and/or desktop computers, server computers and mainframe computers. Further, one computing device may be configured as an information processor 1602 and a user computing device 1604, depending upon operations being executed at a particular time.

With continued reference to FIG. 16, information processor 1602 can be configured to access one or more databases 1603 for the present disclosure, including source code repositories and other information. However, it is contemplated that information processor 1602 can access any required databases via communication network 1606 or any other communication network to which information processor 1602 has access. Information processor 1602 can communicate with devices comprising databases using any known communication method, including a direct serial, parallel, universal serial bus ("USB") interface, or via a local or wide area network.

User computing devices 1604 can communicate with information processors 1602 using data connections 1608, which are respectively coupled to communication network 1606. Communication network 1606 can be any communication network, but typically is or includes the Internet or other computer network. Data connections 1608 can be any known arrangement for accessing communication network 1606, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1604 preferably have the ability to send and receive data across communication network 1606, and are equipped with web browsers, software disclosures, or other means, to provide received data on display devices incorporated therewith. By way of example, user computing device 1604 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 1606, and that wireless communication can be provided between wireless devices and information processors 1602.

System 1600 preferably includes software that provides functionality described in greater detail herein, and preferably resides on one or more information processors 1602 and/or user computing devices 1604. One of the functions performed by information processor 1602 is that of operating as a web server and/or a web site host. Information processors 1602 typically communicate with communication network 1606 across a permanent i.e., un-switched data connection 1608. Permanent connectivity ensures that access to information processors 1602 is always available.

Figure 17:
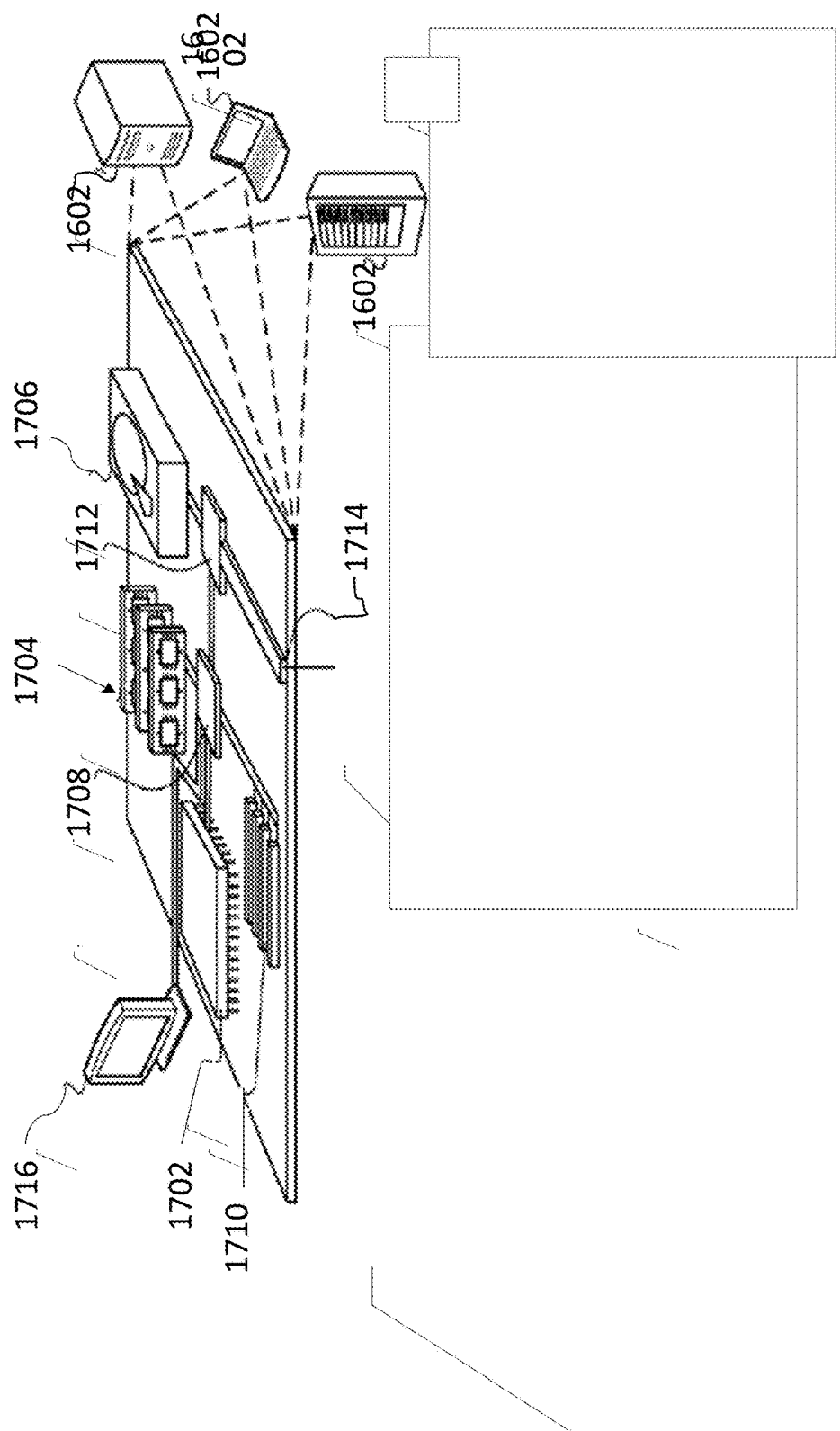
FIG. 17 shows an example of an information processor that can be used to implement the techniques described herein the present disclosure.

FIG. 17 shows an example information processor 1602 that can be used to implement the techniques described herein. The information processor 1602 is intended to represent various forms of digital computers, such as laptops, desktops, workstations, personal digital assistants, servers, blade servers, mainframes, and other appropriate computers. The components shown in FIG. 17, including connections and relationships, and their functions, are meant to be exemplary only, and are not meant to limit implementations of the inventions described and/or claimed in this document.

The information processor 1602 includes a processor 1702, a memory 1704, a storage device 1706, a high-speed interface 1708 connecting to the memory 1704 and multiple high-speed expansion ports 1710, and a low-speed interface 1712 connecting to a low-speed expansion port 1714 and the storage device 1706. Each of the processor 1702, the memory 1704, the storage device 1706, the high-speed interface 1708, the high-speed expansion ports 1710, and the low-speed interface 1712, are interconnected using various busses, and can be mounted on a common motherboard or in other manners as appropriate. The processor 1702 can process instructions for execution within the information processor 1602, including instructions stored in the memory 1704 or on the storage device 1706 to display graphical information for a GUI on an external input/output device, such as a display 1716 coupled to the high-speed interface 1708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1704 stores information within the information processor 1602. In some implementations, the memory 1704 is a volatile memory unit or units. In some implementations, the memory 1704 is a non-volatile memory unit or units. The memory 1704 can also be another form of computer-readable medium, such as a magnetic or optical disk.

The storage device 1706 is capable of providing mass storage for the information processor 1602. In some implementations, the storage device 1706 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1704, the storage device 1706, or memory on the processor 1702.

The high-speed interface 1708 can be configured to manage bandwidth-intensive operations, while the low-speed interface 1712 can be configured to manage lower bandwidth-intensive operations. Of course, one of ordinary skill in the art will recognize that such allocation of functions is exemplary only. In some implementations, the high-speed interface 1708 is coupled to the memory 1704, the display 1716 (e.g., through a graphics processor or accelerator), and to the high-speed expansion ports 1710, which can accept various expansion cards (not shown). In an implementation, the low-speed interface 1712 is coupled to the storage device 1706 and the low-speed expansion port 1714. The low-speed expansion port 1714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 1602 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, an disclosure program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, an disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

The invention claimed is:

1. A computer-implemented method for preparing and providing database patching as a service, the method comprising:

accessing database patch information by at least one computing device, configured by executing instructions stored on non-transitory processor readable media, to provide database patching as a service to a plurality of computing devices in a distributed computer environment, wherein the database patch information represents a respective new database patch for a respective database system;

downloading, by the at least one computing device, at least one package comprising the respective new database patch;

accessing, by the at least one computing device, a model usable for implementing database patching for a plurality of different database systems, wherein each of the plurality of different database systems has a plurality of respective releases and each respective release has respective database patching requirements;

determining, by the at least one computing device, a current release of the respective database system configured with at least one of the plurality of computing devices in the distributed computer environment;

determining, by the at least one computing device, patching requirements for implementing the respective new database patch to the current release of the respective database system;

customizing, by the at least one computing device, the model as a function of: the database patch information; the current release of the respective database system; and the patching requirements for implementing the respective new patch to the current release of the respective database system;

generating, by the at least one computing device, in a test lab that includes access to respective base levels of a plurality of different database systems, a clone of the respective database;

executing in the test lab, by the at least one computing device using the model, pre-patching steps for the new database patch on the clone of the respective database;

executing in the test lab, by the at least one computing device using the model, patching steps for the new database patch on the clone of the respective database; and executing in the test lab, by the at least one computing device using the model, post-patching steps for the new database patch on the clone of the respective database;

where the pre-patching steps, patching steps, and post-patching steps complete successfully, implementing, on the clone of the respective database, a rollback process and implementing the respective new database patch, by the at least one computing device for the at least one of the plurality of computing devices in the distributed computer environment configured with the current release of the respective database system, as a function of the pre-patching steps, the patching steps, and the post-patching steps performed on the respective database system.

2. The computer-implemented method of claim 1, further comprising:

determining, by the at least one computing device, a failed process; and generating and transmitting, by the at least one computing device, a notification associated with the failed process.

3. The computer-implemented method of claim 2, wherein the failed process includes at least one of an invalid database object, a failed patching process, and a failed rollback process.

4. The computer-implemented method of claim 1, wherein the model can be configured by parameters representing network configuration information, database configuration information, and standby database configuration information.

5. The computer-implemented method of claim 1, wherein the model includes a plurality of submodels.

6. The computer-implemented method of claim 5, wherein the plurality of submodels include operations for pre-patch logical fixes, patching database objects, post-patch logical fixes, recompiling patched database objects, and hardening database security.

7. The computer-implemented method of claim 1, further comprising creating, by the at least one computing device, a database restore point prior to executing the pre-patching steps and the post-patching steps and removing the restore point after patching, by the at least one computing device using the model, the respective database.

8. The computer-implemented method of claim 1, where the rollback process on the clone of the respective database is unsuccessful:
  generating, by the at least one computing device, a first notification representing the failed rollback process; and
  transmitting, by the at least one computing device, the first notification to at least one other computing device.

9. The computer-implemented method of claim 1, where at least one of the pre-patching steps, the patching steps, and the post-patching steps are unsuccessfully implemented on the clone of the respective database:
  generating, by the at least one computing device, a second notification representing the at least one of the pre-patching steps, the patching steps, and the post-patching steps; and
  transmitting, by the at least one computing device, the second notification to at least one other computing device.

10. The computer-implemented method of claim 1, wherein following the rollback process on the clone of the respective database completed successfully:
  destroying, by the at least one computing device, the clone of the respective database.

11. A computer-implemented system for preparing and providing database patching as a service, the system comprising:
  at least one computing device, wherein the at least one computing device is configured by executing instructions for providing database patching as a service to a plurality of computing devices in a distributed computer environment, including by:
    accessing database patch information representing a respective new database patch for a respective database system;
    downloading at least one package comprising the respective new database patch;
    accessing a model usable for implementing database patching for a plurality of different database systems, wherein each of the plurality of different database systems has a plurality of respective releases and each respective release has respective database patching requirements;
    determining a current release of the respective database system configured with at least one of the plurality of computing devices in the distributed computer environment;
    determining patching requirements for implementing the respective new database patch to the current release of the respective database system;
    customizing the model as a function of: the database patch information; the current release of respective database system; and the patching requirements for implementing the respective new patch to the current release of the respective database system;
    generating in a test lab that includes access to respective base levels of a plurality of different database systems, a clone of the respective database a clone of the respective database;
    executing in the test lab, using the model, pre-patching steps for the new database patch on the clone of the respective database;
    executing in the test lab, using the model, patching steps for the new database patch on the clone of the respective database; and
    executing in the test lab, using the model, post-patching steps for the new database patch on the clone of the respective database;
    where the pre-patching steps, patching steps, and post-patching steps complete successfully, implementing, on the clone of the respective database, a rollback process;
    where the rollback process on the clone of the respective database completes successfully:
    implementing the respective new database patch, for the at least one of the plurality of computing devices in the distributed computer environment configured with the current release of the respective database system, as a function of the pre-patching steps, the patching steps, and the post-patching steps performed on the respective database system.

12. The system of claim 11, wherein the at least one computing device is configured by executing instructions for:
  determining a failed process; and
  generating and transmitting a notification associated with the failed process.

13. The system of claim 12, wherein the failed process includes at least one of an invalid database object, a failed patching process, and a failed rollback process.

14. The system of claim 11, wherein the model can be configured by parameters representing network configuration information, database configuration information, and standby database configuration information.

15. The system of claim 11, wherein the model includes a plurality of submodels.

16. The system of claim 15, wherein the plurality of submodels includes operations for pre-patch logical fixes, patching database objects, post-patch logical fixes, recompiling patched database objects, and hardening database security.

17. The system of claim 11, wherein the at least one computing device is configured by executing instructions for:
  creating a database restore point prior to executing the pre-patching steps and the post-patching steps and removing the restore point after patching, by the at least one computing device using the model, the respective database.

18. The computer-implemented system of claim 11, where the rollback process on the clone of the respective database is unsuccessful:
  generating a first notification representing the failed rollback process; and
  transmitting the first notification to at least one other computing device.

19. The computer-implemented system of claim 11, where at least one of the pre-patching steps, the patching steps, and the post-patching steps are unsuccessfully implemented on the clone of the respective database:
  generating, by the at least one computing device, a second notification representing the at least one of the pre-patching steps, the patching steps, and the post-patching steps; and
  transmitting the second notification to at least one other computing device.

20. The computer-implemented system of claim 11, wherein following the rollback process on the clone of the respective database completed successfully:
  destroying the clone of the respective database.

* * * * *